(12) United States Patent
Abe et al.

(10) Patent No.: US 8,752,363 B2
(45) Date of Patent: Jun. 17, 2014

(54) FUEL FLOW CONTROL METHOD AND FUEL FLOW CONTROL SYSTEM OF GAS TURBINE COMBUSTOR FOR HUMID AIR GAS TURBINE

(71) Applicant: Hitachi, Ltd., Tokyo (JP)

(72) Inventors: Kazuki Abe, Tokai (JP); Tomomi Koganezawa, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/728,600

(22) Filed: Dec. 27, 2012

(65) Prior Publication Data

US 2013/0174571 A1    Jul. 11, 2013

(30) Foreign Application Priority Data

Jan. 6, 2012   (JP) ................................ 2012-000971

(51) Int. Cl.
*F02C 9/00*    (2006.01)

(52) U.S. Cl.
USPC ...................................... 60/39.281; 60/39.53

(58) Field of Classification Search
USPC .......... 60/39.26, 39.281, 39.3, 39.511, 39.53, 60/39.59, 737, 740
See application file for complete search history.

(56) References Cited

U.S. PATENT DOCUMENTS

| | | | | |
|---|---|---|---|---|
| 6,813,889 B2* | 11/2004 | Inoue et al. | ....................... | 60/737 |
| 7,581,379 B2* | 9/2009 | Yoshida et al. | ............. | 60/39.463 |
| 8,151,549 B2* | 4/2012 | Sasaki et al. | ................ | 60/39.511 |
| 2001/0022078 A1 | 9/2001 | Horii et al. | | |
| 2003/0070415 A1* | 4/2003 | Hatamiya et al. | .......... | 60/39.511 |
| 2007/0017205 A1* | 1/2007 | Sasaki et al. | .................. | 60/39.53 |
| 2007/0017227 A1* | 1/2007 | Horiuchi et al. | ................ | 60/775 |
| 2008/0229755 A1* | 9/2008 | Koganezawa et al. | .......... | 60/775 |
| 2009/0038287 A1* | 2/2009 | Sasaki et al. | .................. | 60/39.53 |
| 2009/0320438 A1* | 12/2009 | Koganezawa et al. | ....... | 60/39.15 |
| 2010/0269482 A1* | 10/2010 | Hirota et al. | ................. | 60/39.53 |
| 2012/0031103 A1 | 2/2012 | Abe et al. | | |

FOREIGN PATENT DOCUMENTS

| | | |
|---|---|---|
| JP | 7-189743 A | 7/1995 |
| JP | 11-72029 A | 3/1999 |
| JP | 2008-175098 A | 7/2008 |
| JP | 2012-36778 A | 2/2012 |
| JP | 2012-36779 A | 2/2012 |

* cited by examiner

*Primary Examiner* — Phutthiwat Wongwian
(74) *Attorney, Agent, or Firm* — Crowell & Moring LLP

(57) ABSTRACT

Provided is a fuel flow control method of a gas turbine combustor provided in a humid air gas turbine, by which method NOx generation in the gas turbine combustor is restricted before and after the starting of humidification and combustion stability is made excellent. The fuel flow control method of a gas turbine combustor provided with a plurality of combustion sections, to which a fuel is individually supplied, a part of the gas turbine combustor including a combustion section or sections, which are more excellent in flame holding performance than the remaining part, the method evaluating a moisture content of a combustion air at the startup of humidification on the basis of a humidification water quantity and an air temperature after humidification and controlling a fuel ratio supplied to the combustion section or sections of excellent flame holding performance when fuel ratios of fuels supplied to the respective combustion sections are controlled in accordance with a humidified state of a compressed air brought about by a humidifier provided in the humid air gas turbine.

8 Claims, 20 Drawing Sheets

FIG.2
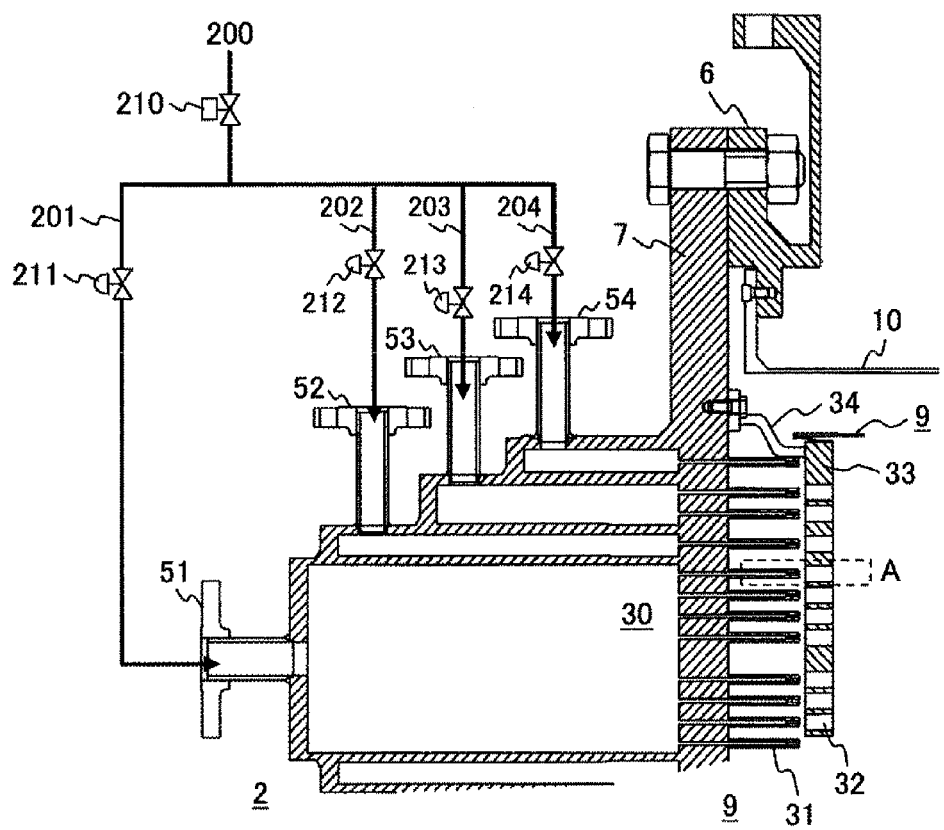
DETAILED PART A
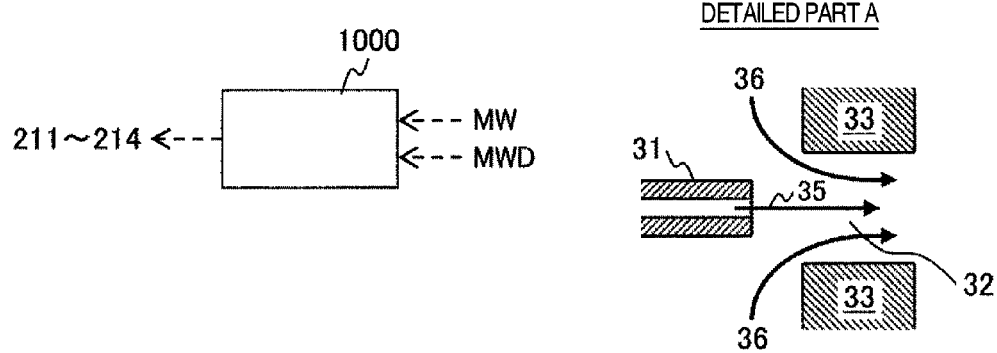

FUEL FLOW CONTROL METHOD AND FUEL FLOW CONTROL SYSTEM OF GAS TURBINE COMBUSTOR FOR HUMID AIR GAS TURBINE

BACKGROUND OF THE INVENTION

The present invention relates to a fuel flow control method and a fuel flow control system of a gas turbine combustor provided in a humid air gas turbine.

JP-A-2008-175098 discloses fuel control means capable of maintaining flame stability before and after the starting of humidification while ensuring a low NOx performance of a combustor in a humid air gas turbine power plant, which achieves an improvement in output and efficiency through adding moisture to a gas turbine working fluid (air) to humidify the same and using the humidified air to recover heat energy stored in gas turbine exhaust gases.

Generally, when the number of revolution rises at the startup of a gas turbine, an operating state tends to become unstable due to disturbance as compared with that after a rated number of revolution is reached, since a compressor intake air flow rate and the vibration characteristic of a rotating body vary.

In humid air gas turbine power plants, since disturbance is caused on a gas turbine when humidification is started in the course of an increase in number of revolution, it is desirable to start humidification in a partially loaded state after a rated number of revolution is reached, in order to ensure stability at the startup.

A major part of NOx generated in a combustor comprises thermal NOx generated by oxidation of nitrogen contained in air when fuel, such as natural gas, kerosene, light oil, or the like, having a small nitrogen content is used.

Since generation of thermal NOx is high in temperature dependency, the basic idea of a low NOx combustion method in gas turbines, in which such fuel is used, resides generally in a decrease in flame temperature. Premixed combustion, in which fuel and air are beforehand mixed and then burned, is known as a measure for a decrease in flame temperature.

Also, in the case where combustion air is made high in temperature by a regenerator as in a humid air gas turbine plant, it is necessary to attain low NOx through appropriately controlling flame temperature while preventing self-ignition of fuel, and a method, shown in JP-A-2008-175098, of jetting fuel and air as a multiplicity of coaxial jet streams of small diameter into a combustion chamber is effective.

In order to make a low NOx performance and flame compatible with each other in such low NOx combustor, it is essential to regulate a fuel-air ratio, which is a ratio of fuel flow rate and air flow rate, in a predetermined range.

JP-A-7-189743 discloses means of regulating a ratio of fuel flow rate and air flow rate aiming at a change in opening degree of a compressor inlet guide valve, which accompanies operation of a gas turbine, a change in atmospheric temperature, a change in air flow rate, which is attributable to a change in atmospheric pressure, and a change in fuel flow rate, which is attributable to fuel temperature and a change in fuel heating value.

JP-A-11-72029 discloses means of achieving an increase and a decrease in fuel flow rate in accordance with humidity of atmospheric intake air and intake spraying water quantity, in a gas turbine system, in which intake air of a compressor is cooled by intake spraying for reduction in compressive power.

When humidification is started in a humid air gas turbine power plant, combustion air in a combustor is increased in humidity, so that heat of combustion is deprived of to lead to a decrease in flame temperature and a NOx yield is reduced.

Also, since addition of moisture causes a turbine working fluid to increase in flow rate, fuel flow rate is decreased in order to maintain the number of revolution constant. Reduction in fuel flow rate leads to a decrease in flame temperature, so that a NOx yield decreases. Further, since a decrease in flame temperature leads to reduction in recovered heating value in a regenerator, combustion air temperature drops. A decrease in combustion air temperature causes flame temperature to be decreased to lead to reduction in NOx yield.

Humidification is started in this manner whereby (1) an increase in moisture, (2) reduction in fuel flow rate, and (3) a decrease in air temperature advance at the same time to lead to a decrease in flame temperature, so that a NOx yield decreases but combustion stability is degraded.

Setting combustion air flow rate low taking previous account of humidification enables eliminating occurrence of flame blow-off under a high humid condition. However, in a combustor with combustor air distribution thus set, flame temperature rises conversely to the matter described above before the starting of humidification, so that flame stability is ensured but a NOx yield tends to increase.

That is, in a humid air gas turbine plant, before and after the starting of humidification, NOx generation and flame stability in a combustor suffer a large change in condition. Also, it is thought that at the time of an increase in gas turbine load, lag is caused by valve control and a volume of an associated system until moisture is actually added to combustion air after the starting of humidification.

It is thought that at the time of a decrease in gas turbine load, lag is caused due to the same reason until combustion air is decreased in humidity.

When in starting the humidifying operation and stopping the operation, combustion air humidity is varied after a lag time, flame temperature possibly rises or drops excessively, so that there is a possibility of a remarkable increase in NOx and a decrease in combustion stability.

Accordingly, there is a demand for control means for stable combustion of a combustor in low NOx under such change in condition.

Hereupon, as disclosed in JP-A-2008-175098, combustion stability after humidification can be ensured with the use of means for setting a ratio of fuel supplied to a combustion section of an excellent flame holding performance to control fuel so that a part of combustion sections of a combustor provided with a plurality of combustion sections supplied individually with fuel comprises combustion section or sections (provided with air holes, which impart swirl components to air flow), which are more excellent in flame holding performance than the remaining combustion sections and for a predetermined period of time after the starting of humidification, combustion temperature in the combustion section or sections having an excellent flame holding performance is made equal to or higher than combustion temperature before the starting of humidification.

In the case where in accommodating such change in humidity, the means as disclosed in JP-A-7-189743 is applied to ensure stability in combustion, it is thought to measure moisture in combustion air to control a ratio of fuel flow rate on the basis of the value thereof.

Hereupon, it is thought to measure moisture in combustion air with the use of a humidity sensor.

In view of a humidity measuring position, humidity measurement at an outlet of a humidifier is first taken into consideration. Since air at an outlet of a humidifier is close to the dew point, however, there is caused a problem that accuracy of measurement cannot be expected in measurement with a humidity sensor. Secondly, humidity measurement at an outlet of a regenerator is taken into consideration. Since air at an outlet of a regenerator is as high as 450° C. or above, however, high heat resistance is required of a humidity sensor.

Subsequently, a performance demanded of a humidity sensor is taken into consideration. Due to a change in humidity contained in air, a combustion state varies every moment. Therefore, it is demanded of a humidity sensor to measure humidity in air with high responsibility to control a ratio of fuel flow rate to maintain stable combustion.

Thus, there are caused many problems in measuring humidity in air with the use of a humidity sensor to exercise combustion control to achieve stable combustion.

JP-A-11-72029 discloses means of achieving stable combustion accommodating that change in combustion air humidity, which is caused by a change in atmospheric humidity and intake spraying water quantity, in a gas turbine system, in which intake air of a compressor is cooled by an intake spraying device for reduction in compressive power.

Since the humid air gas turbines disclosed in the prior art comprise a humidifier positioned downstream of a compressor, a large change in combustion air humidity is caused by not only intake spraying with the compressor but also humidification with the humidifier. Also, when compressor discharge air is varied in temperature and humidity depending upon the operating condition of an intake spraying device, it is thought that the humidifier is varied in humidification in accordance therewith.

However, no examination has been made for the technology of controlling a fuel flow rate of a gas turbine combustor taking account of both a change in humidity in a compressor due to intake spraying and a change in humidity in a humidifier in order to cause stable combustion in the gas turbine combustor of a humid air gas turbine.

Also, no examination has been made for the technology of controlling a fuel flow rate of a humid air gas turbine combustor to be capable of operation in high reliability before humidification, before and after the starting of humidification, and during humidification in a humid air gas turbine without damage in combustion stability of a gas turbine combustor and of maintaining a NOx yield in low level irrespective of a humidified condition.

BRIEF SUMMARY OF THE INVENTION

It is an object of the invention to provide a fuel flow control method and a fuel flow control system of a gas turbine combustor provided in a humid air gas turbine, which are capable of operation in high reliability before humidification, before and after the starting of humidification, and during humidification without damage in combustion stability and of maintaining a NOx yield in low level irrespective of a humidified condition, in a humid air gas turbine for humidification of air with the use of a spray type humidifier.

According to the invention, there is provided a fuel flow control method of a gas turbine combustor provided in a humid air gas turbine comprising a compressor, the gas turbine combustor, in which a fuel is burned with the use of a compressed air compressed by the compressor to generate a combustion gas, a turbine driven by a combustion gas generated in the gas turbine combustor, and a humidifier for humidifying a compressed air compressed by the compressor and supplied to the gas turbine combustor with a spray water, the gas turbine combustor comprising a plurality of combustion sections comprised of a plurality of fuel nozzles for supplying of a fuel and a plurality of air flow passages for supplying of a combustion air, in which method fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, in which method a fuel flow rate supplied to the combustion sections of the gas turbine combustor is controlled by evaluating a moisture content of a combustion air supplied to the gas turbine combustor from the humidifier on the basis of a humidification water quantity supplied to a compression air in the humidifier and an air temperature after humidification, and regulating a fuel ratio of a fuel flow rate supplied to the combustion section or sections of excellent flame holding performance formed in the gas turbine combustor and a fuel flow rate supplied to the remaining combustion sections on the basis of the evaluation of moisture content in the combustion air.

Also, according to the invention, there is provided a fuel flow control method of a gas turbine combustor provided in a humid air gas turbine comprising a compressor, an intake spraying device for spraying water on an intake air in an intake section of the compressor, a combustor, in which a fuel is burned with the use of a compressed air compressed by the compressor, a turbine driven by a combustion gas from the combustor, and a spray type humidifier for humidifying a compressed air compressed by the compressor with a spray water, the gas turbine combustor comprising a plurality of combustion sections comprised of a plurality of fuel nozzles for supplying of a fuel and a plurality of air flow passages for supplying of a combustion air, in which method fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, in which method a fuel flow rate supplied to the combustion sections of the gas turbine combustor is controlled by evaluating a moisture content of a combustion air supplied to the gas turbine combustor from the humidifier on the basis of a humidification water quantity in the intake spraying device, a humidification water quantity supplied to a compression air, and an air temperature after humidification with the humidifier, and regulating a fuel ratio of a fuel flow rate supplied to the combustion section or sections of excellent flame holding performance formed in the gas turbine combustor and a fuel flow rate supplied to the remaining combustion sections on the basis of the evaluation of moisture content in the combustion air.

According to the invention, there is provided a fuel flow control system of a gas turbine combustor provided in a humid air gas turbine comprising a compressor, the gas turbine combustor, in which a fuel is burned with the use of a compressed air compressed by the compressor to generate a combustion gas, a turbine driven by a combustion gas generated in the gas turbine combustor, and a humidifier for humidifying a combustion air compressed by the compressor and supplied to the gas turbine combustor, the gas turbine combustor comprising a plurality of combustion sections comprised of a plurality of fuel nozzles for supplying of a fuel and a plurality of air flow passages for supplying of a combustion air, in which system fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, the fuel flow control system, which controls a flow rate of a fuel supplied to the plurality of combustion sections of the gas turbine combustor, comprising a fuel flow control unit for outputting a fuel flow command to control a fuel supplied to the plurality of combustion sections of the gas turbine combustor on the basis of deviation between a load command MWD and an actual electric power generation MW, a fuel flow rate ratio setter for setting fuel ratios of fuels, respectively, supplied to the plurality of combustion sections of the gas turbine combustor on the basis of a fuel flow command output from the fuel flow control unit, and an actual fuel flow control unit for actuating fuel control valves, which regulate flow rate ratios of fuels, respectively, supplied to the plurality of combustion sections of the gas turbine combustor on the basis of fuel flow rate ratio set values set by the fuel flow rate ratio setter, and further comprising a humidifier outlet maximum humidity computing unit for calculating a maximum humidity at an outlet of the humidifier from an outlet air temperature in the humidifier, a humidifier outlet humidity computing unit for calculating a humidifier outlet humidity from a spray water quantity of the humidifier and a humidifier outlet maximum humidity calculated by the humidifier outlet maximum humidity computing unit, a combustion temperature F1 gain computing unit and a humidity F1 gain computing unit for calculating control gains, respectively, for combustion temperature and humidity with respect to a fuel ratio of a fuel supplied to the combustion section or sections of excellent flame holding performance in the gas turbine combustor from a combustion air flow rate of a combustion air supplied to the gas turbine combustor and a humidifier outlet humidity calculated by the humidifier outlet humidity computing unit, and in which system a flow rate ratio of a fuel supplied to the plurality of combustion sections of the gas turbine combustor is controlled by using the fuel flow rate ratio setter to set a fuel ratio of a fuel supplied to the combustion section or sections of excellent flame holding performance out of the plurality of combustion sections provided in the gas turbine combustor on the basis of computed values of the combustion temperature F1 gain computing unit and the humidity F1 gain computing unit.

Also, according to the invention, there is provided a fuel flow control system of a gas turbine combustor provided in a humid air gas turbine comprising a compressor, the gas turbine combustor, in which a fuel is burned with the use of a compressed air compressed by the compressor to generate a combustion gas, a turbine driven by a combustion gas generated in the gas turbine combustor, and a humidifier for humidifying a combustion air compressed by the compressor and supplied to the gas turbine combustor, the gas turbine combustor comprising a plurality of combustion sections comprised of a plurality of fuel nozzles for supplying of a fuel and a plurality of air flow passages for supplying of a combustion air, in which system fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, the fuel flow control system, which controls a flow rate of a fuel supplied to the plurality of combustion sections of the gas turbine combustor, comprising a fuel flow control unit for outputting a fuel flow command to control a fuel supplied to the plurality of combustion sections of the gas turbine combustor on the basis of deviation between a load command MWD and an actual electric power generation MW, a fuel flow rate ratio setter for setting fuel ratios of fuels, respectively, supplied to the plurality of combustion sections of the gas turbine combustor on the basis of a fuel flow command output from the fuel flow control unit, and an actual fuel flow control unit for actuating fuel control valves, which regulate flow rate ratios of fuels, respectively, supplied to the plurality of combustion sections of the gas turbine combustor on the basis of fuel flow rate ratio set values set by the fuel flow rate ratio setter, and further comprising a humidifier outlet maximum vapor quantity computing unit for calculating a maximum vapor quantity at an outlet of the humidifier from an outlet air temperature in the humidifier, a humidifier outlet vapor quantity computing unit for calculating a humidifier outlet vapor quantity from a spray water quantity in the humidifier and a humidifier outlet maximum vapor quantity calculated by the humidifier outlet maximum vapor quantity computing unit, a humidifier outlet humidity computing unit for calculating a humidifier outlet humidity from a humidifier outlet vapor quantity calculated by the humidifier outlet vapor quantity computing unit, a combustion temperature F1 gain computing unit and a humidity F1 gain computing unit for calculating control gains, respectively, for combustion temperature and humidity with respect to a fuel ratio of a fuel supplied to the combustion section or sections of excellent flame holding performance in the gas turbine combustor from a combustion air flow rate of a combustion air supplied to the gas turbine combustor and a humidifier outlet humidity calculated by the humidifier outlet humidity computing unit, and in which system a flow rate ratio of a fuel supplied to the plurality of combustion sections of the gas turbine combustor is controlled by using the fuel flow rate ratio setter to set a fuel ratio of a fuel supplied to the combustion section or sections of excellent flame holding performance out of the plurality of combustion sections provided in the gas turbine combustor on the basis of computed values of the combustion temperature F1 gain computing unit and the humidity F1 gain computing unit.

Also, according to the invention, there is provided a fuel flow control system of a gas turbine combustor provided in a humid air gas turbine comprising a compressor, an intake spraying device, which sprays water onto an intake air at an intake part of the compressor, the gas turbine combustor, in which a fuel is burned with the use of a compressed air compressed by the compressor to generate a combustion gas, a turbine driven by a combustion gas generated in the gas turbine combustor, and a humidifier for humidifying a combustion air compressed by the compressor and supplied to the gas turbine combustor, the gas turbine combustor comprising a plurality of combustion sections comprised of a plurality of fuel nozzles for supplying of a fuel and a plurality of air flow passages for supplying of a combustion air, in which system fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, the fuel flow control system, which controls a flow rate of a fuel supplied to the plurality of combustion sections of the gas turbine combustor, comprising a fuel flow control unit for outputting a fuel flow command to control a fuel supplied to the plurality of combustion sections of the gas turbine combustor on the basis of deviation between a load command MWD and an actual electric power generation MW, a fuel flow rate ratio setter for setting fuel ratios of fuels, respectively, supplied to the plurality of combustion sections of the gas turbine combustor on the basis of a fuel flow command output from the fuel flow control unit, and an actual fuel flow control unit for actuating fuel control valves, which regulate flow rate ratios of fuels, respectively, supplied to the plurality of combustion sections of the gas turbine combustor on the basis of fuel flow rate ratio set values set by the fuel flow rate ratio setter, and further comprising a humidifier outlet maximum humidity computing unit for calculating a maximum humidity at an outlet of the humidifier from an outlet air temperature in the humidifier, a humidifier outlet humidity computing unit for calculating a humidifier outlet humidity from a spray water quantity of the humidifier, a spray water quantity of the intake spraying device, and a humidifier outlet maximum humidity calculated by the humidifier outlet maximum humidity computing unit, a combustion temperature F1 gain computing unit and a humidity F1 gain computing unit for calculating control gains, respectively, for combustion temperature and humidity with respect to a fuel ratio of a fuel supplied to the combustion section or sections of excellent flame holding performance in the gas turbine combustor from a combustion air flow rate of a combustion air supplied to the gas turbine combustor and a humidifier outlet humidity calculated by the humidifier outlet humidity computing unit, and in which system a flow rate ratio of a fuel supplied to the plurality of combustion sections of the gas turbine combustor is controlled by using the fuel flow rate ratio setter to set a fuel ratio of a fuel supplied to the combustion section or sections of excellent flame holding performance out of the plurality of combustion sections provided in the gas turbine combustor on the basis of computed values of the combustion temperature F1 gain computing unit and the humidity F1 gain computing unit.

Also, according to the invention, there is provided a fuel flow control system of a gas turbine combustor provided in a humid air gas turbine comprising a compressor, an intake spraying device, which sprays water onto an intake air at an intake part of the compressor, the gas turbine combustor, in which a fuel is burned with the use of a compressed air compressed by the compressor to generate a combustion gas, a turbine driven, by a combustion gas generated in the gas turbine combustor, and a humidifier for humidifying a combustion air compressed by the compressor and supplied to the gas turbine combustor, the gas turbine combustor comprising a plurality of combustion sections comprised of a plurality of fuel nozzles for supplying of a fuel and a plurality of air flow passages for supplying of a combustion air, in which system fuel ratios of fuels, respectively, supplied to the plurality of combustion sections of the gas turbine combustor are controlled on the basis of deviation between a load command and electric power generation, a part of the plurality of combustion sections provided in the gas turbine combustor being formed into a combustion section or sections, which are more excellent in flame holding performance than the remaining combustion sections, the fuel flow control system, which controls a flow rate of a fuel supplied to the plurality of combustion sections of the gas turbine combustor, comprising a fuel flow control unit for outputting a fuel flow command to control a fuel supplied to the plurality of combustion sections of the gas turbine combustor on the basis of deviation between a load command MWD and an actual electric power generation MW, a fuel flow rate ratio setter for setting fuel ratios of fuels, respectively, supplied to the plurality of combustion sections of the gas turbine combustor on the basis of a fuel flow command output from the fuel flow control unit, and an actual fuel flow control unit for actuating fuel control valves, which regulate flow rate ratios of fuels, respectively, supplied to the plurality of combustion sections of the gas turbine combustor on the basis of fuel flow rate ratio set values set by the fuel flow rate ratio setter, and further comprising a humidifier outlet maximum vapor quantity computing unit for calculating a maximum vapor quantity at an outlet of the humidifier from an outlet air temperature in the humidifier, a humidifier spraying quantity corrected quantity computing unit for calculating a corrected quantity of a humidifier spraying quantity from a spray water quantity of the intake spray device, a humidifier outlet vapor quantity computing unit for calculating a humidifier outlet vapor quantity from a spray water quantity in the humidifier, a humidifier outlet maximum vapor quantity calculated by the humidifier outlet maximum vapor quantity computing unit, and a humidifier spraying quantity corrected quantity calculated by the humidifier spraying quantity corrected quantity computing unit, a humidifier outlet humidity computing unit for calculating a humidifier outlet humidity from a humidifier outlet vapor quantity calculated by the humidifier outlet vapor quantity computing unit, a combustion temperature F1 gain computing unit and a humidity F1 gain computing unit for calculating control gains, respectively, for combustion temperature and humidity with respect to a fuel ratio of a fuel supplied to the combustion section or sections of excellent flame holding performance in the gas turbine combustor from a combustion air flow rate of a combustion air supplied to the gas turbine combustor and a humidifier outlet humidity calculated by the humidifier outlet humidity computing unit, and in which system a flow rate ratio of a fuel supplied to the plurality of combustion sections of the gas turbine combustor is controlled by using the fuel flow rate ratio setter to set a fuel ratio of a fuel supplied to the combustion section or sections of excellent flame holding performance out of the plurality of combustion sections provided in the gas turbine combustor on the basis of computed values of the combustion temperature F1 gain computing unit and the humidity F1 gain computing unit.

According to the invention, it is possible to realize a fuel flow control method and a fuel flow control system of a gas turbine combustor provided in a humid air gas turbine, which are capable of operation in high reliability before humidification, before and after the starting of humidification, and during humidification without damage in combustion stability and of maintaining a NOx yield in low level irrespective of a humidified condition, in a humid air gas turbine for humidification of air with the use of a spray type humidifier.

Other objects, features and advantages of the invention will become apparent from the following description of the embodiments of the invention taken in conjunction with the accompanying drawings.

BRIEF DESCRIPTION OF THE SEVERAL VIES OF THE DRAWINGS

FIG. 2 is a partially sectional view showing the construction of fuel nozzles provided in the gas turbine combustor, according to the first embodiment of the invention, shown in FIG. 1.

DETAILED DESCRIPTION OF THE INVENTION

A fuel flow control method and a fuel flow control system of a humid air gas turbine combustor according to embodiments of the invention will be described below with reference to the drawings.

(Embodiment 1)

A fuel flow control method and a fuel flow control system of a gas turbine combustor, according to a first embodiment of the invention, provided in a humid air gas turbine will be described with FIGS. 1 to 10.

Figure 1:
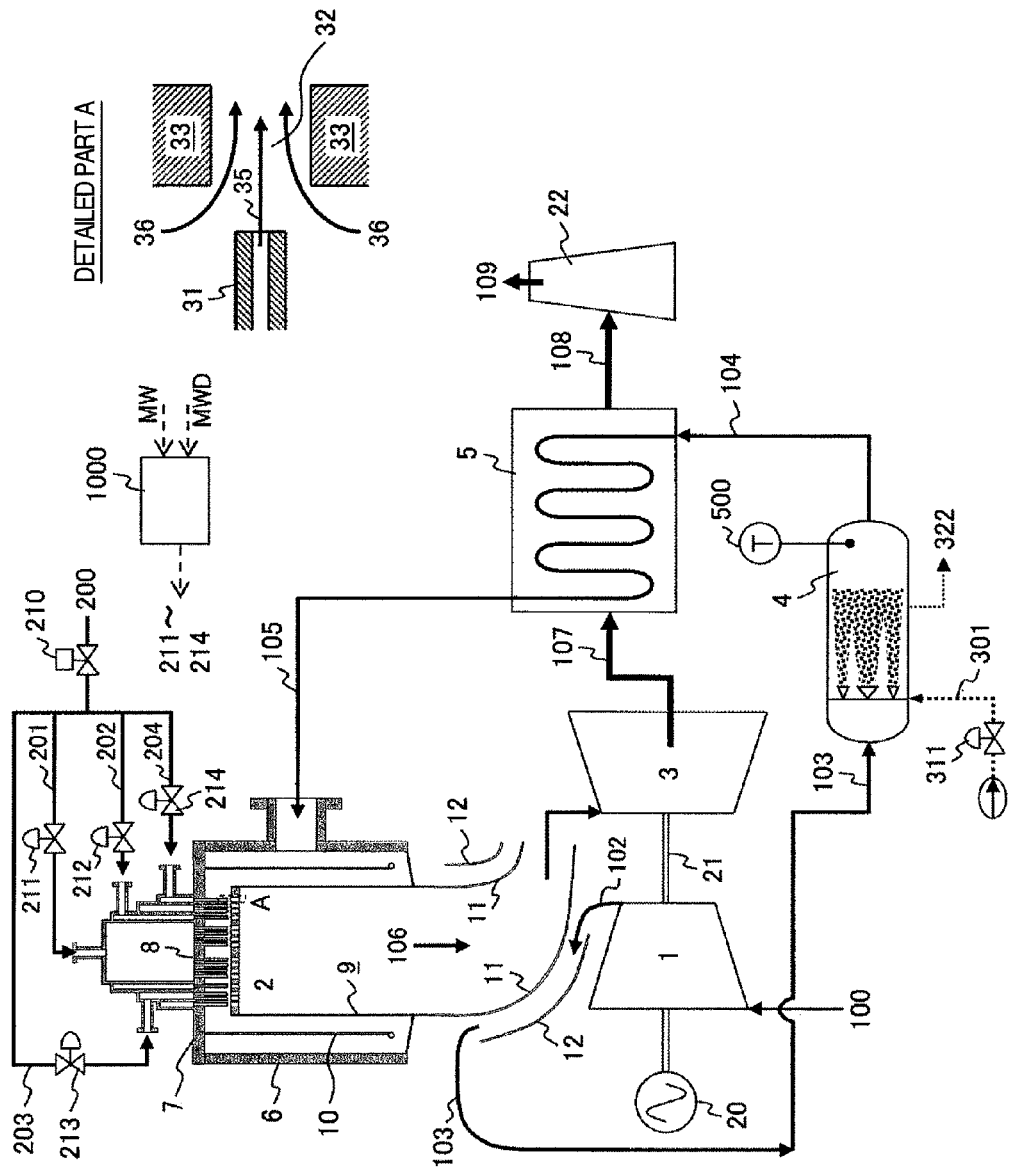
FIG. 1 is a configuration showing a humid air gas turbine system provided with a gas turbine combustor according to a first embodiment of the invention.

FIG. 1 is a system flow diagram showing the whole configuration of a humid air gas turbine system, to which the fuel flow control method and the fuel flow control system of the gas turbine combustor, according to the first embodiment of the invention, provided in the humid air gas turbine are applied.

In the humid air gas turbine system shown in FIG. 1, a humid air gas turbine for power generation comprises a compressor 1, a gas turbine combustor 2, a turbine 3, a humidifier 4, and a regenerator 5, and a generator 20 is rotated by output of the turbine 3 to generate electricity.

The gas turbine combustor 2 is contained in a combustor casing 6 and a combustor cover 7. A fuel nozzle 8 is provided centrally of an upstream end of the gas turbine combustor 2, downstream of which fuel nozzle is provided a substantially cylindrical-shaped combustor liner 9 for isolation of combustion air and combustion gas.

High pressure air 102 obtained by compression of gas turbine intake air 100 (atmospheric pressure) at the compressor 1 inlet by means of the compressor 1 flows between a transition piece 11 and a transition piece flow sleeve 12 to perform convection-cooling of the transition piece 11 to make unhumidified high temperature air 103.

The unhumidified high temperature air 103 is fed to the humidifier 4 to have moisture added thereto to make humidified air 104. The humidifier 4 humidifies air by means of water spraying. Here, the humidified air 104 humidified by the humidifier 4 is put in a state below the vapor saturation condition (less than the relative humidity 100%).

In order to monitor the soundness of the humid air gas turbine, a thermometer for measurement of humidifier outlet temperature 500 is provided at the humidifier 4 outlet.

The humidified air 104, to which moisture is added in the humidifier 4, is led to the regenerator 5 to be heated in heat exchange with gas turbine exhaust gas 107 (turbine outlet low-pressure combustion gas).

The humidified air 104 thus heated makes high-temperature high-humidity air 105 to be poured into the combustor casing 6. The high-temperature high-humidity air 105 in the combustor casing 6 passes through a substantially annular-shaped space outside of the combustor liner 9 to flow toward a combustor head of the gas turbine combustor 2 to be used for convection-cooling of the combustor liner 9 in mid course.

Part of the high-temperature high-humidity air 105 flows into the combustor liner 9 from a cooling port provided in the combustor liner 9 to be used for film cooling. The remainder of the high-temperature high-humidity air 105 (36 in Part A in the drawing) flows into the combustor liner 9 from an air port 32 described below to be used for combustion in the gas turbine combustor 2 together with fuel jetted from the fuel nozzles 31 to make high-temperature combustion gas 106 to be fed to the turbine 3.

Turbine outlet low-pressure combustion gas 107 leaving the turbine 3 has its heat recovered in the regenerator 5 to make regenerator outlet low-pressure combustion gas 108 to be exhausted as exhaust gas 109 from an exhaust tower 22.

Driving force obtained in the turbine 3 is transmitted to the compressor 1 and the generator 20 through a shaft 21. Part of the driving force makes compressive power for air in the compressor 1 and the remainder of the driving force is converted into electricity in the generator 20.

Generated output MW being an output of a humid air gas turbine generating plant is controlled by regulation of opening and closing of fuel flow control valves 211 to 214, which calculates fuel flow rate supplied to the gas turbine combustor 2 on the basis of a command signal from a control unit 1000.

Water quantity for humidification of air in the humidifier 4 is controlled by regulation of opening and closing of a humidifier spray water quantity control valve 311 by means of a command signal from the control unit 1000.

FIG. 2 is a view showing the construction of a fuel nozzle 9 provided in the gas turbine combustor 2, according to the embodiment, used in the humid air gas turbine shown in FIG. 1.

A multiplicity of fuel nozzles 31 are mounted to a fuel nozzle header 30 provided on the combustor cover 7 of the gas turbine combustor 2 and an air hole plate 33 provided with a multiplicity of air holes 32, each of which is conformed to each of the multiplicity of fuel nozzles 31, is mounted to the combustor cover 7 through a support 34.

The fuel nozzles 31 and the air holes 32 formed through the air hole plate 33 are arranged substantially concentrically to form a fuel jet 35 centrally and a multiplicity of coaxial air jets 36 therearound as shown in Part A of FIG. 2.

Since fuel and air are unmixed in the air holes 32 formed through the air hole plate 33 owing to the coaxial jet configuration, selfignition of the fuel is not caused even when combustion air is high in temperature as in a humid air gas turbine and so the air hole plate 33 does not suffer dissolution loss, so that the gas turbine combustor 2 can be made high in reliability.

Since such small coaxial jets are formed in multiplicity to cause an increase in fuel and air interfaces and promotion in mixing, it is possible to restrict a NOx yield during combustion in the gas turbine combustor 2.

Figure 3:
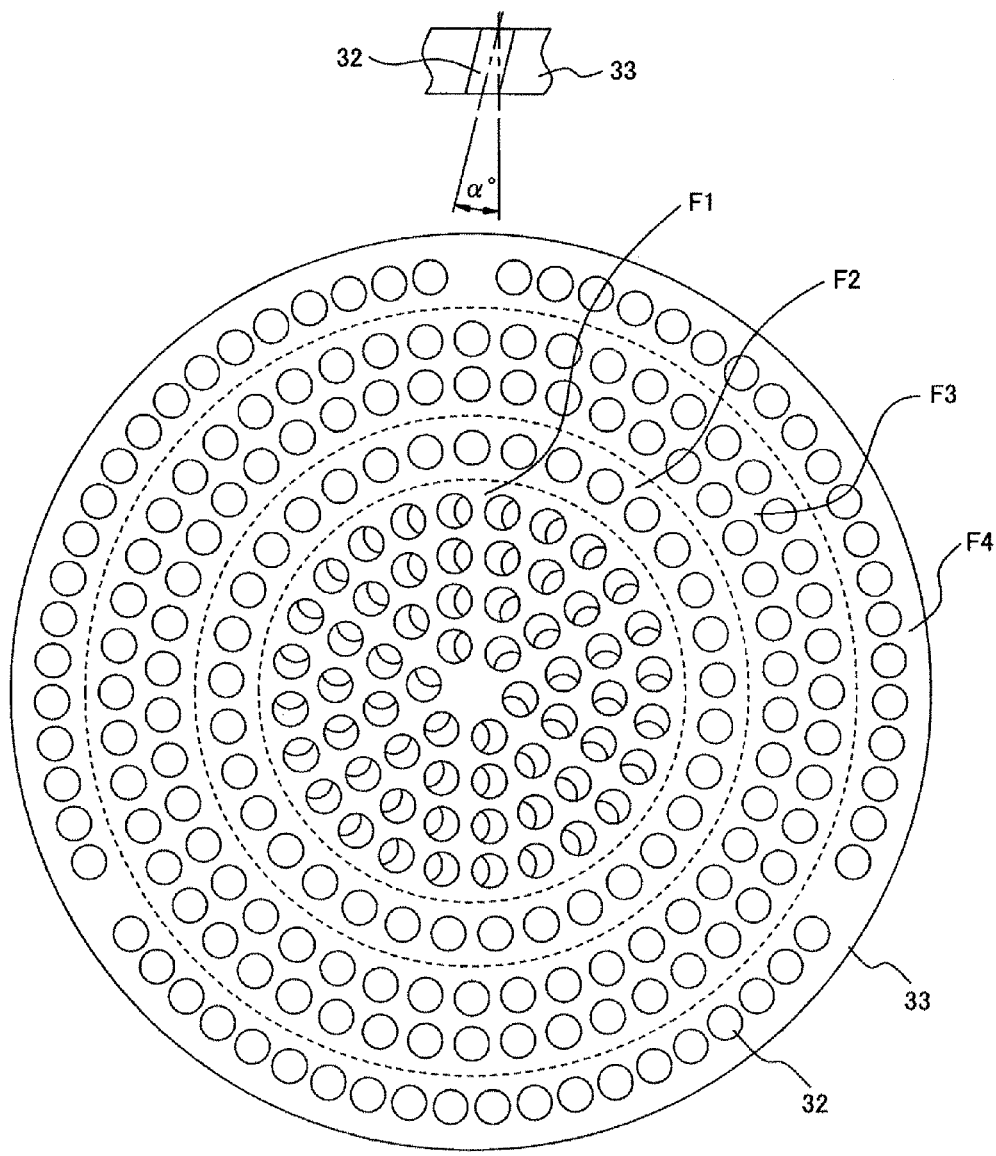
FIG. 3 is a front view showing an air hole plate provided in the gas turbine combustor, shown in FIG. 2, of the first embodiment of the invention with fuel nozzles as viewed from a downstream side of a combustion chamber.

FIG. 3 is a view showing the air hole plate 33 provided in the gas turbine combustor 2 of the embodiment as viewed from a downstream side of the combustor. In the gas turbine combustor 2 of the embodiment, the multiplicity of air holes 32 (while not shown, the fuel nozzles 31 pairing with the air holes 32) are arranged concentrically in eight annular air hole rows from a radially inner peripheral side of the air hole plate 33 to a radially outer peripheral side.

Burners constituting a combustion part of the gas turbine combustor 2 are grouped into F1 burners arranged in four rows (first to fourth rows) around a center to form a first group (F1) combustion part, F2 burners arranged in a fifth row to form a second group (F2) combustion part, F3 burners arranged in two rows (sixth and seventh rows) outside thereof to form a third group (F3) combustion part, and F4 burners arranged in an outermost periphery (eighth row) to form a fourth group (F4) combustion part, and as shown in FIG. 2, fuel supplied from fuel lines 201 to 204, respectively, provided with the flow control valves 211 to 214 is fed to the fuel nozzles 31 through flanges 51 to 54 provided on the header 30 for the respective groups of F1 burners to F4 burners.

Such grouped configuration of the fuel lines 201 to 204 enables fuel staging, in which the fuel nozzles for fueling are varied stepwise in number to conform to a change in fuel flow for the gas turbine, whereby it is possible to ensure the combustion stability at the time of gas turbine partial load operation and to make NOx low.

Those air holes 32 on the air hole plate 33, which are centrally arranged in four rows (F1) to constitute F1 burners, are formed in the shape of slant holes, which are angled (a° in FIG. 3) in a pitch circle tangential direction, whereby the whole air flow passing through the air holes 32 is revolved and a circulating flow thus generated makes flame stable.

In F2 to F4 burners arranged on an outer peripheral side of F1 burners, flame is stabilized by combustion heat of the central F1 burners. Accordingly, when humidification is started in the humid gas turbine to cause an increase in combustion air, F1 flame is improved in combustion stability by increasing the fuel flow supplied to F1 burners of the gas turbine combustor 2 and thus producing a high temperature part locally.

While F2 burners and the following burners are decreased in fuel flow as fuel supplied to F1 burners is increased, combustion stability in the whole burners is ensured since flame in the former is stabilized by combustion heat of F1 burners.

An example of the operating method of the humid air gas turbine, to which the fuel flow control method and the fuel flow control system of the gas turbine combustor 2 according to the embodiment are applied, will be described with reference to respective characteristics graphs shown in FIGS. 4 and 5.

Figure 4:
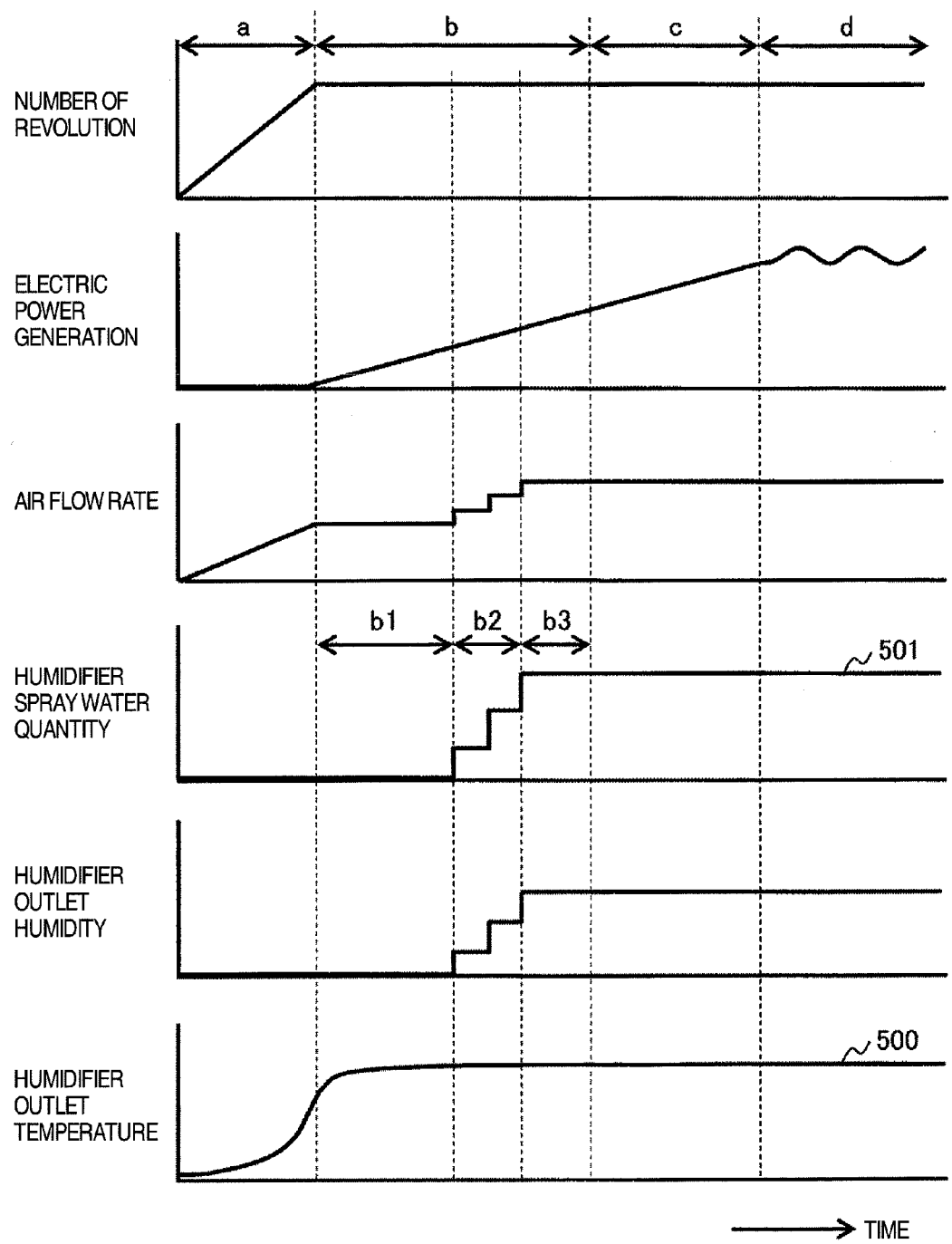
FIG. 4 is a characteristics graph representing an example of the operating method of the humid air gas turbine system provided with the gas turbine combustor of the first embodiment of the invention.

In the characteristics graph of FIG. 4 for the operating method of the humid air gas turbine, an axis of abscissas indicates time from starting and an axis of ordinate indicates number of revolution, electric power generation, air flow rate, spray water quantity of the humidifier 4, outlet humidity of the humidifier 4, and outlet temperature 500 of the humidifier 4, respectively, in order from the top.

Figure 5:
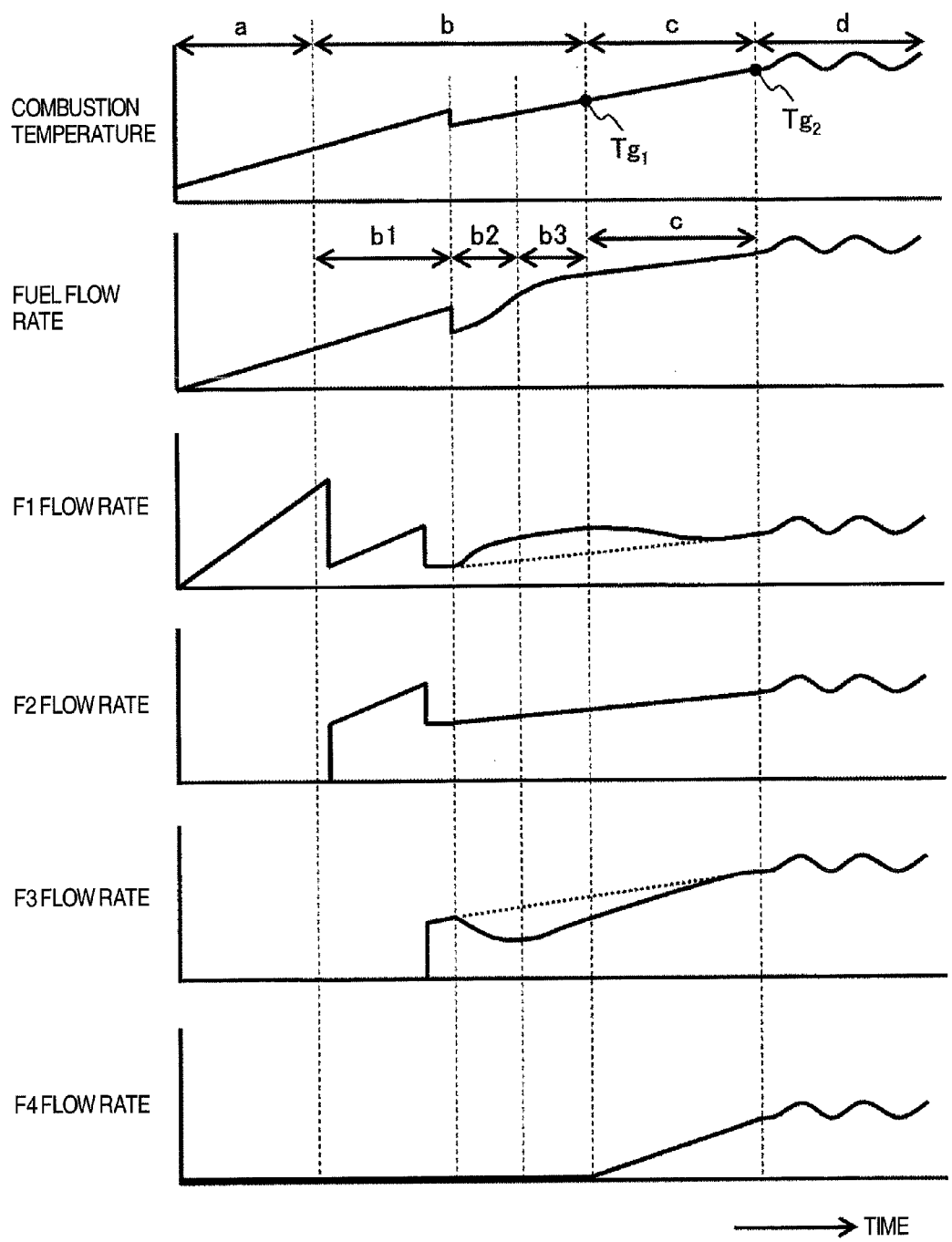
FIG. 5 is a characteristics graph representing another example of the operating method of the humid air gas turbine system provided with the gas turbine combustor of the first embodiment of the invention.

In the characteristics graph of FIG. 5 for the operating method of the humid air gas turbine, an axis of abscissas indicates time from starting as in FIG. 4 and an axis of ordinate schematically indicates combustion temperature of the gas turbine combustor 2, whole fuel flow rate of the gas turbine combustor 2, and individual fuel flow rates (F1 flow rate to F4 flow rate) of the respective fuel lines 201 to 204, through which fuel is supplied to F1 to F4 burners, in order from the top.

In the characteristics graphs of FIG. 4 and FIG. 5, time a indicates a revolution increasing time from starting to attainment of a rated revolution, time b indicates time, during which combustion temperature after humidification is equal to or lower than temperature $Tg_1$, during a load increasing time in starting of the gas turbine, time c indicates time, during which combustion temperature after humidification is equal to or higher than temperature $Tg_1$ and is higher than $Tg_1$ but equal to or lower than temperature $Tg_2$, during a load increasing time in starting of the gas turbine, and time d indicates a load-following operation time after termination of starting.

The load increasing time b further is divided into moisture non-addition time b1 in the first half, moisture addition varying time b2, and moisture addition constant time b3. Here, combustion temperature of the gas turbine combustor 2 is made to assume a value found from fuel-air ratio (ratio of fuel flow rate and air flow rate), combustion air temperature, and combustion air humidity.

In the operating method of the fuel flow control system of the gas turbine combustor 2 of the embodiment in a humid air gas turbine, first at the time of ignition and revolution increasing, during which fuel flow rate is relatively small, only F1 burners positioned around the axis of the gas turbine combustor 2 are caused by a command from the control unit 1000 of the fuel flow control system to burn for operation (that is, F1 fuel is supplied to only the fuel line 201 in FIG. 2) to increase revolution near the rated revolution no-load condition. Such separate combustion of F1 burners is referred to as ¼ mode in the following description.

Subsequently, in the following load increasing process (time b), F2 fuel is charged into F2 burners arranged on the outer peripheral side of F1 burners of the gas turbine combustor 2 for operation in (F1+F2). That is, F1 fuel and F2 fuel are supplied to the fuel lines 201 and 202 and a command from the control unit 1000 regulates opening degrees of the flow control valves 211 and 212, respectively, provided on the fuel lines 201 and 202 to control fuel flow rates of F1 fuel and F2 fuel, respectively. This operation is referred to as ²⁄₄ mode.

Further, a state, in which F3 fuel is supplied to the fuel line 203 for charging of fuel into F3 burners arranged on the outer peripheral side of F2 burners of the gas turbine combustor 2 to cause ignition on F3 burners, is referred to as ¾ mode.

In the preceding process, moisture is not added to the humidifier 4 of the humid air gas turbine (b1). Specifically, the humidifier feed valve 311 for regulation of water flow rate supplied to the humidifier 4 of the humid air gas turbine shown in FIG. 1 is fully closed.

In this course, respective fuel flow rates of F1 fuel, F2 fuel, and F3 fuel, respectively, supplied to F1 burners, F2 burners, and F3 burners are controlled by regulating the opening degrees of the flow control valves 211, 212, and 213 so that gas turbine power generation increases in accordance with a load increasing rate determined in the starting plan of the gas turbine.

Flow rates of F1 fuel, F2 fuel, and F3 fuel supplied to F1 burners, F2 burners, and F3 burners through the respective fuel lines 201 to 203 are distributed at a rate determined so that combustion in the gas turbine combustor 2 is made stable and NOx thus generated is made minimum.

In the fuel flow control method and the fuel flow control system of the gas turbine combustor 2 according to the embodiment, addition of moisture to the humidifier 4 of the humid air gas turbine is started in ¾ mode. In accordance with a humidification starting command, a command signal from the control unit 1000 opens the air cooler side humidifier feed water valve 311 provided on the humidifier 4, so that water of flow rate conformed to the opening degree is poured into the humidifier 4 (time b2).

Then the opening degree of the air cooler side humidifier feed valve 311 is controlled for regulation so that the quantity of water flowing in the air cooler 28 assumes a predetermined value (time b2 to b3).

At this time, a command signal from the control unit 1000 controls respective fuel flow rates supplied to F1 burners, F2 burners, and F3 burners of the gas turbine combustor 2 so that gas turbine power generation increases in accordance with a load increasing rate determined in the starting plan of the gas turbine. In order to mainly serve ensuring combustion stability, it is required that F1 fuel supplied to F1 burners be set so that a ratio of F1 fuel flow rate to the whole fuel flow rate is increased after the starting of humidification by the humidifier 4 in comparison to that before the starting of humidification.

In the characteristics graph of the operating method of the gas turbine system provided with the gas turbine combustor of the embodiment shown in FIG. 5, straight line portions indicated by dotted lines indicate setting before humidification. In the gas turbine combustor 2 of the embodiment, fuel flow rate supplied to F1 burners is set so that as F1 flow rate is increased as shown by the solid line relative to the straight line portion indicated by the dotted line, fuel flow rate supplied to F3 burners is set to decrease F3 flow rate as shown by the solid line relative to the straight line portion indicated by the dotted line.

Determination based on F1 combustion temperature is effective to determine an optimum F1 flow rate for ensuring the combustion stability of the gas turbine combustor 2.

Among various elements required for combustion temperature calculation, realtime direct measurement of combustion air temperature by a humidity sensor is problematically difficult as described above.

Hereupon, it is examined in the gas turbine combustor 2 of the embodiment to use the control unit 1000 of the fuel flow control system to evaluate humidifier outlet humidity $Hm_{h,\ exit}$, which is outlet humidity of the humidifier 4, from humidifier spray water quantity $G_{wh,\ sp}$, which is spray water quantity fed to the humidifier 4.

As compared with humidity measurement by a humidity sensor, it is easy to measure humidifier spray water quantity $G_{wh,\ sp}$ with high accuracy at high speed. Accordingly, realtime evaluation of the humidifier outlet humidity $Hm_{h,\ exit}$ is made possible provided that it is possible to one to one evaluate humidifier outlet humidity $Hm_{h,\ exit}$ from humidifier spray water quantity $G_{wh,\ sp}$.

In the case where residence time in the humidifier 4 is sufficiently ensured, while humidifier spray water quantity $G_{wh,\ sp}$ is small, humidification of air is easy due to being far from the vapor saturation condition, but it is thought that when humidifier spray water quantity $G_{wh,\ sp}$ is large, humidification of air is made hard due to being near to the vapor saturation condition.

Specifically, it is thought that when humidifier spray water quantity $G_{wh,\ sp}$ is infinite, humidifier outlet humidity $Hm_{h,\ exit}$ comes close to humidifier outlet maximum humidity $Hm_{h,\ max}$. Under an ideal condition, humidifier outlet maximum humidity $Hm_{h,\ max}$ is saturated humidity $Hm_{h,\ sat}$ at humidifier outlet temperature 500.

Figure 6:
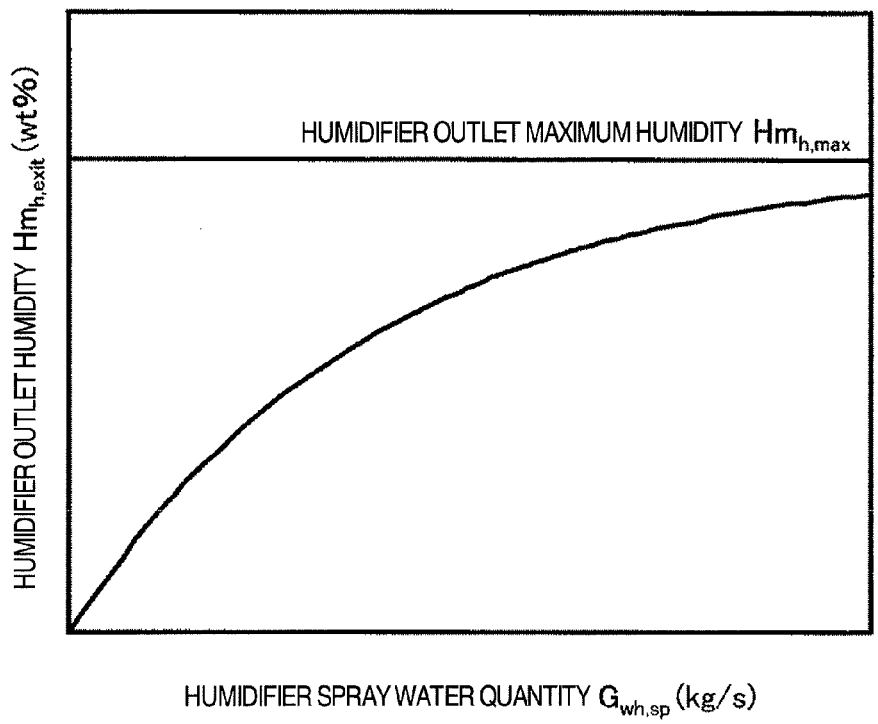
FIG. 6 is a schematic diagram showing the relationship between humidifier spray water quantity and humidifier outlet humidity in the humid air gas turbine system provided with the gas turbine combustor of the first embodiment of the invention.

A schematic diagram of FIG. 6 shows the relationship between humidifier spray water quantity $G_{wh,\ sp}$ and humidifier outlet humidity $Hm_{h,\ exit}$ for the humidifier 4. The relationship can be found by means of an actual measurement value put into data base or a calculating formula, in which humidification is simulated.

In the schematic diagram of FIG. 6 showing the relationship between humidifier spray water quantity and humidifier outlet humidity for the humidifier 4 in the humid air gas turbine system provided with the gas turbine combustor of the first embodiment of the invention, a curve is shown, along which humidifier outlet humidity $Hm_{h,\ exit}$ continuously rises in value when humidifier spray water quantity $G_{wh,\ sp}$ increases.

Figure 7:
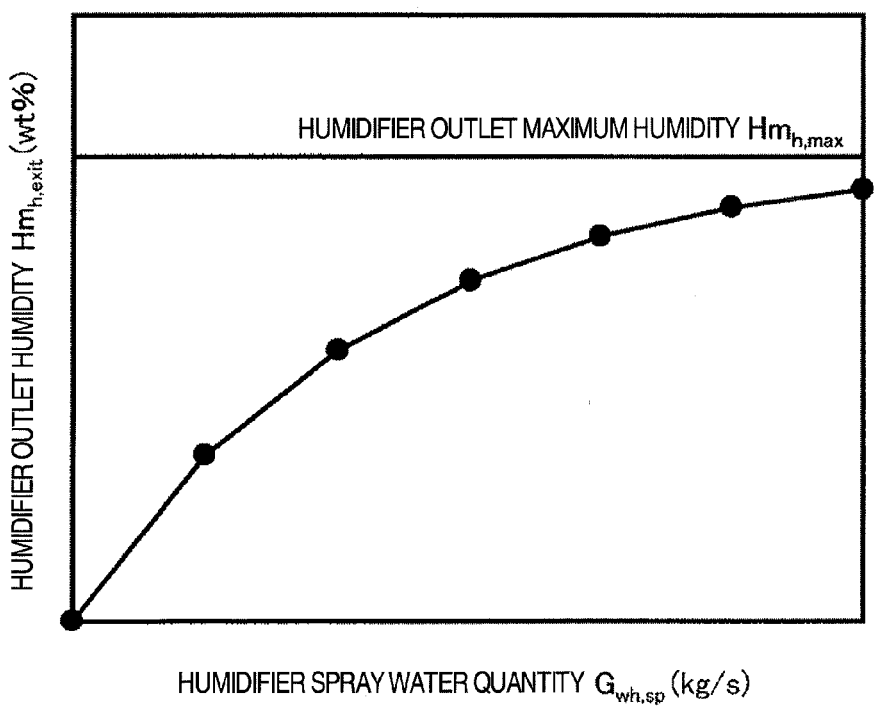
FIG. 7 is a schematic diagram (approximate diagram) showing the relationship between humidifier spray water quantity and humidifier outlet humidity in the humid air gas turbine system provided with the gas turbine combustor of the first embodiment of the invention.

As in a schematic diagram (approximate diagram) of FIG. 7 showing the relationship between humidifier spray water quantity and humidifier outlet humidity for the humidifier 4 in the humid air gas turbine system provided with the gas turbine combustor of the first embodiment of the invention, approximation can also be made by means of a straight line obtained by finding several values of humidifier outlet humidity $Hm_{h,\ exit}$ relative to humidifier spray water quantity $G_{wh,\ sp}$ and connecting the values by straight lines.

Figure 9:
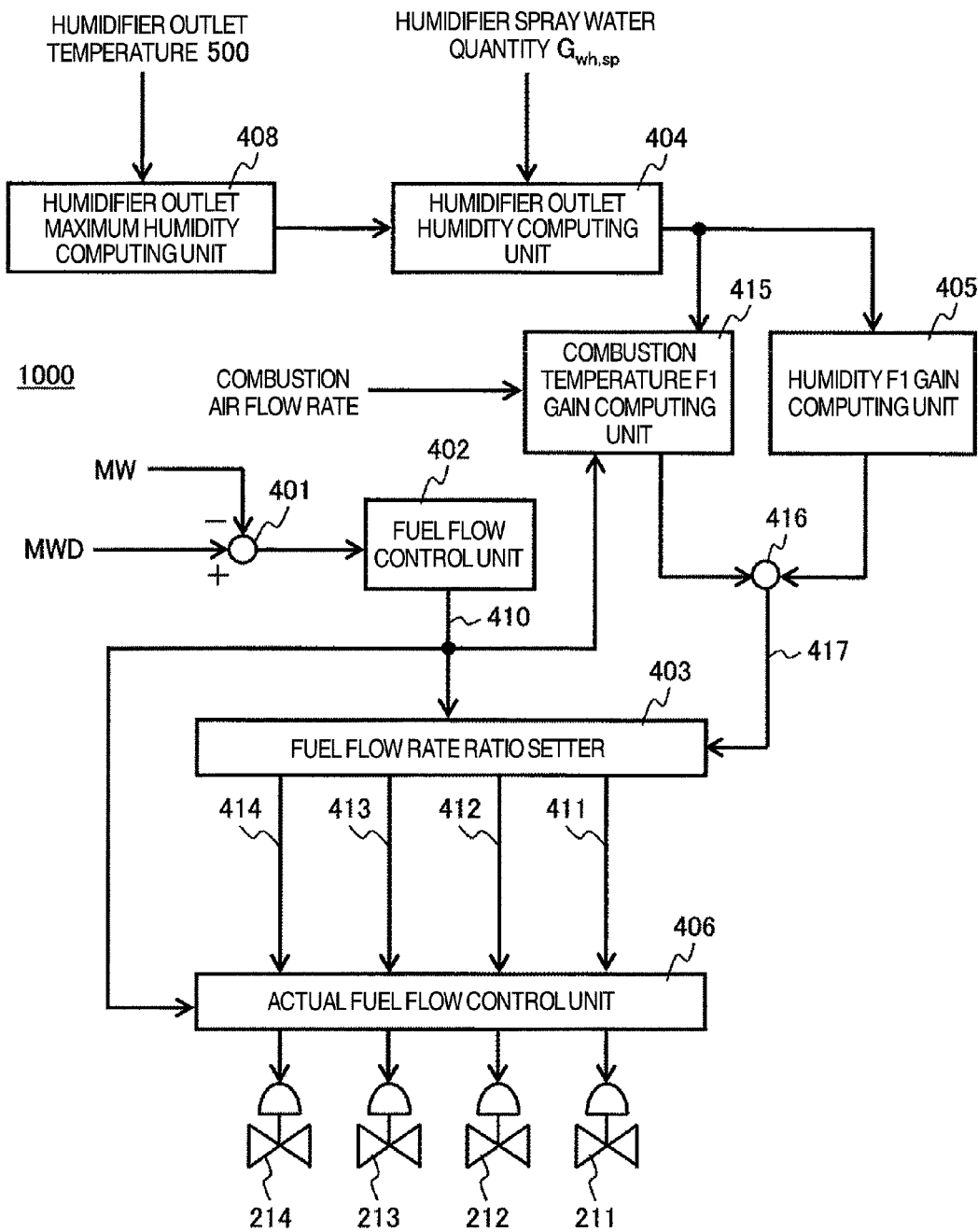
FIG. 9 is a control block diagram showing an example of a control unit constituting a combustion control system of the gas turbine combustor of the first embodiment of the invention provided in a humid air gas turbine.

Combustion temperature in the gas turbine combustor 2 can be calculated from combustion air temperature and fuel-air ratio by means of combustion air humidity used in the control unit 1000 provided in the fuel flow control system of the gas turbine combustor 2, according to the embodiment, shown in FIG. 9. F1 flow rate required for stable combustion is found by calculating combustion temperature for F1 burners, of which a flame stabilizing quality is heightened, and making a comparison among F1 combustion temperatures needed for stable combustion.

The humidity calculating method in the control unit 1000 provided in the fuel flow control system of the gas turbine combustor 2 according to the embodiment is effective not only in that time (time b3 in FIG. 4), during which humidifier spray water quantity 301 for the humidifier 4 is constant, but also in that time (time b2 in FIG. 4), during which humidifier spray water quantity 301 varies. Accordingly, for a transient humidity change of combustion air due to a change in humidifier spray water quantity 301, combustion stability can be ensured by setting of an appropriate F1 flow rate.

Using the characteristics graphs of FIGS. 4 and 5 showing another example of the operating method of the humid air gas turbine system provided with the gas turbine combustor of the first embodiment of the invention, an explanation will be given to a state after humidification as planned is reached.

In the gas turbine combustor 2 of the embodiment, when fuel is increased in order to raise a load to a predetermined one with humidification constant, combustion temperature reaches temperature $Tg_1$. When local combustion temperature is equal to or higher than temperature for generation of NOx, NOx is easily generated despite of high humidity combustion.

Here, it is known from results of element combustion tests that stable combustion in the gas turbine combustor 2 is made possible even in high humidity combustion when combustion temperature in the gas turbine combustor 2 rises to some extent. So, in operating the humid air gas turbine system provided with the gas turbine combustor according to the embodiment, when combustion temperature in the gas turbine combustor 2 becomes equal to or higher than temperature $Tg_1$, F1 flow rate having thus been increased is gradually decreased and F3 flow rate is gradually increased as shown in FIG. 5.

When combustion temperature in the gas turbine combustor 2 reaches temperature $Tg_2$ being higher than temperature $Tg_1$, F1 flow rate is set so that local combustion temperatures in F1 burners and F3 burners become equivalent to each other.

Thus, during that time (time c in FIGS. 4 and 5), in which combustion temperature in the gas turbine combustor 2 is equal to or higher than temperature $Tg_1$ but equal to or lower than temperature $Tg_2$, F1 flow rate is decreased conversely to that in time b to enable realizing stable combustion and a further low NOx combustion in the gas turbine combustor 2 over the whole load zone.

Figure 8:
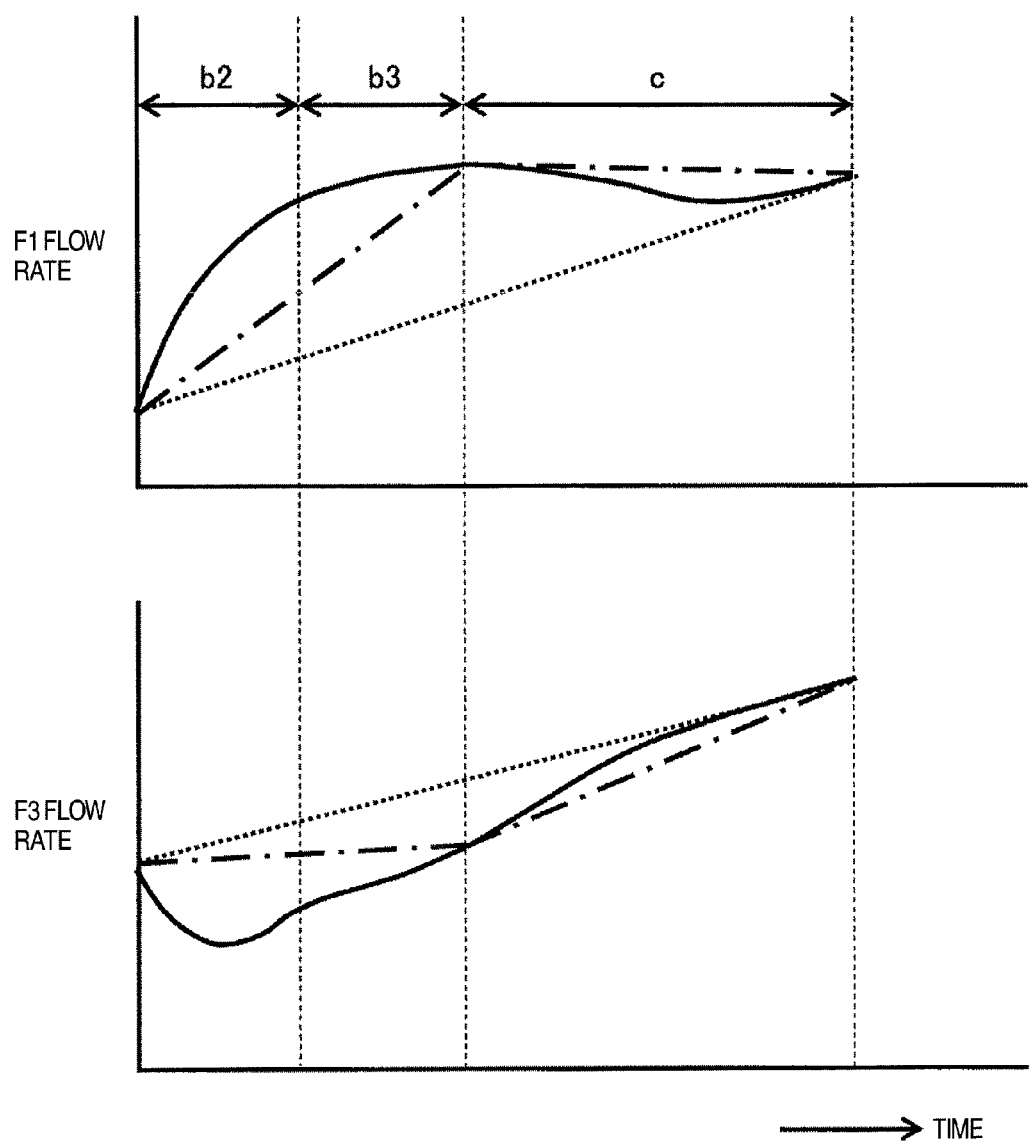
FIG. 8 is a characteristics graph representing a further example of the operating method of the humid air gas turbine system provided with the gas turbine combustor of the first embodiment of the invention.

FIG. 8 is a characteristics graph showing a further example of the operating method of the humid air gas turbine system provided with the gas turbine combustor of the first embodiment of the invention, and in the graph, F1 flow rate and F3 flow rate are taken up and enlarged for time b2, time b3, and time c in FIG. 5.

In the operating method of the humid air gas turbine system provided with the gas turbine combustor, according to the embodiment, shown in the characteristics graph of FIG. 8, straight line portions indicated by dotted lines indicate flow rates, at which combustion temperatures of F1 and F3 burners in the gas turbine combustor 2 are equivalent to each other, and portions shown by solid lines indicate operations corresponding to those shown in FIG. 5.

In the portions shown by the solid lines in the characteristics graph of FIG. 8, F1 flow rate is set high just after the starting of humidification by the humidifier 4 and in that time c, during which combustion temperature becomes equal to or higher than temperature $Tg_1$, fuel flow rate is controlled so that combustion temperatures in F1 and F3 become equivalent to each other in a stage, in which stable combustion is ensured.

Unless the gas turbine combustor 2 is problematic in combustion stability, a simple flow control shown by alternate long and short dash lines is possible. In the flow control shown by alternate long and short dash lines, flow control lines can be determined only by determining F1 flow rate supplied to F1 burners at temperature $Tg_1$ in the gas turbine combustor 2, so that setting of control is facilitated.

At a point of time when power generation or turbine exhaust temperature reaches a predetermined value, starting of the humid air gas turbine is completed and thereafter fuel flow rate supplied to the gas turbine combustor 2 increases or decreases in accordance with an increase or a decrease in load on the humid air gas turbine to follow a load (time d).

In a high load operation of the humid air gas turbine, F4 fuel supplied to F4 burners, positioned on the outermost periphery, among F1 burners to F4 burners provided in the gas turbine combustor 2 is mainly increased or decreased in flow rate. At this time, since a mixture of F4 fuel and air mixes with combustion gases of F1 to F3 burners to become high in temperature, the fuel oxidation reaction slowly advances to enable obtaining a high combustion efficiency.

Since air distribution is set so that temperature after completion of combustion becomes equal to or lower than one, at which generation of NOx becomes conspicuous, combustion, in which generation of NOx from F4 burners is made almost zero, is enabled. Since the reaction is completed even when F4 fuel charged into F4 burners is slight, a continuous fuel exchange is enabled to achieve an improvement in operability.

FIG. 9 shows an example of a concrete control block constituting the control unit 1000 in the fuel flow control system of the gas turbine combustor 2 of the embodiment provided in a humid air gas turbine.

As in the concrete control block constituting the control unit 1000 provided in the fuel flow control system, shown in FIG. 9, of the gas turbine combustor 2 of the embodiment provided in a humid air gas turbine, a subtracter 401 provided in the control unit 1000 is used to find a deviation between a load command MWD given in accordance with a predetermined electric power generation increasing rate and an actual electric power generation MW, and a fuel flow control unit 402 is provided to calculate and output a fuel flow command 410 to an actual fuel flow control unit 406, which controls valve opening degrees of the F1 fuel flow control valve 211 to the F4 fuel flow control valve 214 for supplying to F1 burners to F4 burners of the gas turbine combustor 2, on the basis of that deviation between a load command MWD and an actual electric power generation MW, which is found by the subtracter 401.

The fuel flow command 410 calculated in the fuel flow control unit 402 provided in the control unit 1000 is input into a fuel flow rate ratio setter 403 provided in the control unit 1000.

A humidifier outlet maximum humidity computing unit 408 provided in the control unit 1000 inputs thereinto humidifier outlet temperature 500 measured by the thermometer provided at the outlet of the humidifier 4 to calculate humidifier outlet maximum humidity $Hm_{h,\,max}$, and a humidifier outlet humidity computing unit 404 calculates humidifier outlet humidity $Hm_{h,\,exit}$ from the humidifier outlet maximum humidity $Hm_{h,\,max}$ calculated by the humidifier outlet maximum humidity computing unit 408 and that humidifier spray water quantity $G_{wh,\,sp}$, which is humidifier spray water quantity 301 sprayed into the humidifier 4.

Humidifier outlet humidity $Hm_{h,\,exit}$ calculated by the humidifier outlet humidity computing unit 404 is input into a humidity F1 gain computing unit 405 and a combustion temperature F1 gain computing unit 415 provided in the control unit 1000, respectively.

The humidity F1 gain computing unit 405 calculates F1 gain relative to humidity on the basis of humidity $Hm_{h,\,exit}$. The combustion temperature F1 gain computing unit 415 calculates F1 gain relative to combustion temperature from combustion air flow rate, the fuel flow command 410 calculated by the fuel flow control unit 402, and humidifier outlet humidity $Hm_{h,\,exit}$ calculated by the humidifier outlet humidity computing unit 404.

A product of output of the humidity F1 gain computing unit 405 and output of the combustion temperature F1 gain computing unit 415 is found by a multiplier 416 provided in the control unit 1000 to calculate F1 gain 417, the F1 gain 417 being input into the fuel flow rate ratio setter 403 provided in the control unit 1000.

Figure 10:
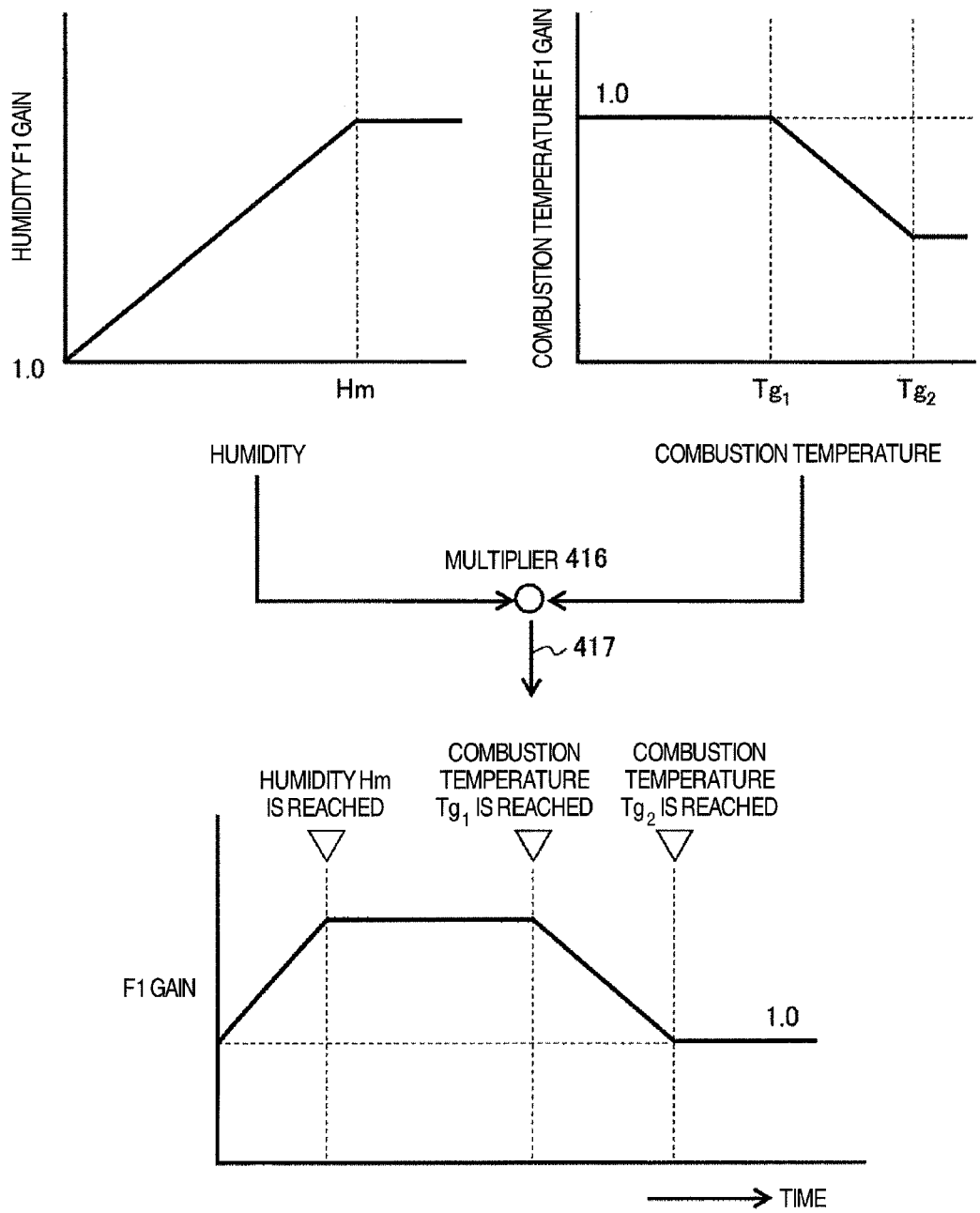
FIG. 10 is a view illustrating the configuration of F1 gain of F1 burners in the combustion control system of the gas turbine combustor, shown in FIG. 9, of the first embodiment of the invention.

FIG. 10 is a schematic diagram showing an example of outputs of the humidity F1 gain computing unit 405 and the combustion temperature F1 gain computing unit 415 provided in the control unit 1000, and F1 gain 17 calculated from such outputs by the multiplier 416.

As shown in FIG. 10, F1 gain 417 for realization of F1 flow rate supplied to F1 burners and shown in FIGS. 5 and 8 can be calculated from humidity and combustion temperature.

The following methods serve to make a low NOx and stable combustion compatible with each other in the gas turbine combustor 2 of the embodiment.

First, F1 gain 417 is increased as humidifier outlet humidity $Hm_{h,\,exit}$ increases. Stable combustion is enabled by having F1 gain 417 following a humidity increase.

A low NOx and stable combustion can be made compatible with each other in the gas turbine combustor 2 by setting F1 gain so as to gradually decrease the same so that after combustion temperature in the gas turbine combustor 2 becomes equal to or higher than combustion temperature $Tg_1$, at which stable combustion can be ensured, after humidification in the humidifier 4, local combustion temperatures of F1 burners to F4 burners in the gas turbine combustor 2 become equivalent to combustion temperature $Tg_2$, at which all combustion temperatures of F1 burners to F4 burners in the gas turbine combustor 2 become equal to one another.

Secondly, as humidifier outlet humidity $Hm_{h,\,exit}$ increases, F1 gain 417 is increased so that F1 combustion temperature in the gas turbine combustor 2 becomes constant. Stable combustion and low NOx combustion can be made compatible with each other in the gas turbine combustor 2 by setting F1 gain 417 so as to increase F1 fuel flow rate in accordance with an increase in humidity so that F1 combustion temperature becomes the same irrespective of a change in humidity.

Then, a low NOx and stable combustion can be made compatible with each other in the gas turbine combustor 2 by setting F1 gain 417 so as to gradually decrease the same so that after combustion temperature after humidification becomes equal to or higher than combustion temperature $Tg_1$, local combustion temperatures of F1 burners to F4 burners become equivalent to combustion temperature $Tg_2$.

Thirdly, as humidifier outlet humidity $Hm_{h,\,exit}$ increases, F1 gain 417 is increased so that F1 combustion temperature in the gas turbine combustor 2 becomes high. It is thought that when humidity increases, a decrease in combustion stability is caused depending upon a combustion condition.

The gas turbine combustor 2 can be heightened in combustion stability against a change in humidity by setting F1 gain 417 so that F1 combustion temperature rises in accordance with an increase in humidity, and thus a further improvement in reliability is achieved.

A low NOx and stable combustion can be made compatible with each other in the gas turbine combustor 2 by setting F1 gain 417 so as to gradually decrease the same so that after combustion temperature after humidification becomes equal to or higher than combustion temperature $Tg_1$, local combustion temperatures of F1 burners to F4 burners become equivalent to combustion temperature $Tg_2$.

Hereupon, with the control unit 1000 of the gas turbine combustor 2 of the embodiment, as shown in FIG. 9, the fuel flow rate ratio setter 403 provided in the control unit 1000 inputs thereinto a fuel flow command 410 output from the fuel flow control unit 402 likewise provided in the control unit 1000 to calculate respective fuel flow ratios (411 to 414) of F1 to F4 with reference to the value of F1 gain 417.

The actual fuel flow control unit 406 provided in the control unit 1000 calculates flow rates or valve opening degrees of respective fuel lines of F1 to F4 from respective fuel flow rate ratios (411 to 414) of F1 to F4 calculated by and output from the fuel flow rate ratio setter 403 and a fuel flow command 410 output from the fuel flow control unit 402 to output the same to the fuel flow control valves 211 to 214 to control the valve opening degrees of the fuel flow control valves 211 to 214, respectively.

Thus, with the gas turbine combustor 2 of the embodiment, the control unit 1000 constituted as shown in FIG. 9 can realize exercising the fuel flow rate control indicated by the solid lines in FIG. 5.

It is thought that time lag is caused by valve control and a volume of an associated system until moisture is actually added to combustion air after starting of humidification. At this time, a low NOx and stable combustion can be made compatible with each other in the gas turbine combustor 2 provided that an actual combustion air humidity is estimated taking account of first order lag with respect to combustion air humidity.

When a gas turbine load decreases, the above matter is especially effective since it is thought that a volume of a system such as piping or the like causes lag until combustion air humidity follows humidifier spray water quantity 301 in the humidifier 4.

Further, since combustion air humidity rapidly decreases in the case where a spray water feed rate to the humidifier 4 is suddenly decreased or spray water supplying is stopped due to some circumstances, it is possible that F1 combustion temperature in the gas turbine combustor 2 becomes too high.

According to the embodiment, since a method for estimating combustion air humidity from feed water quantity enables detection of variation in combustion air humidity, it is possible to avoid a rapid increase in F1 combustion temperature in the gas turbine combustor 2, thus achieving an improvement of a gas turbine in reliability.

Thus, according to the embodiment, a fuel flow control method and a fuel flow control system of a humid air gas turbine combustor, which are capable of operation in high reliability before humidification, before and after starting of humidification, and during humidification without damage in combustion stability and of maintaining a NOx yield in low level irrespective of a humidified condition, can be realized in a humid air gas turbine for humidification of air with a spray type humidifier.

(Embodiment 2)

Subsequently, a fuel flow control method and a fuel flow control system of a gas turbine combustor, according to a second embodiment of the invention, provided in a humid air gas turbine will be described with reference to FIGS. 11 to 13.

Since the fuel flow control system of the gas turbine combustor of the embodiment provided in a humid air gas turbine is common in fundamental constitution to the fuel flow control system of the gas turbine combustor of the first embodiment provided in a humid air gas turbine and shown in FIGS. 1 to 10, descriptions of the constitution and function common to the both are omitted and a different portion will be described below.

Figure 11:
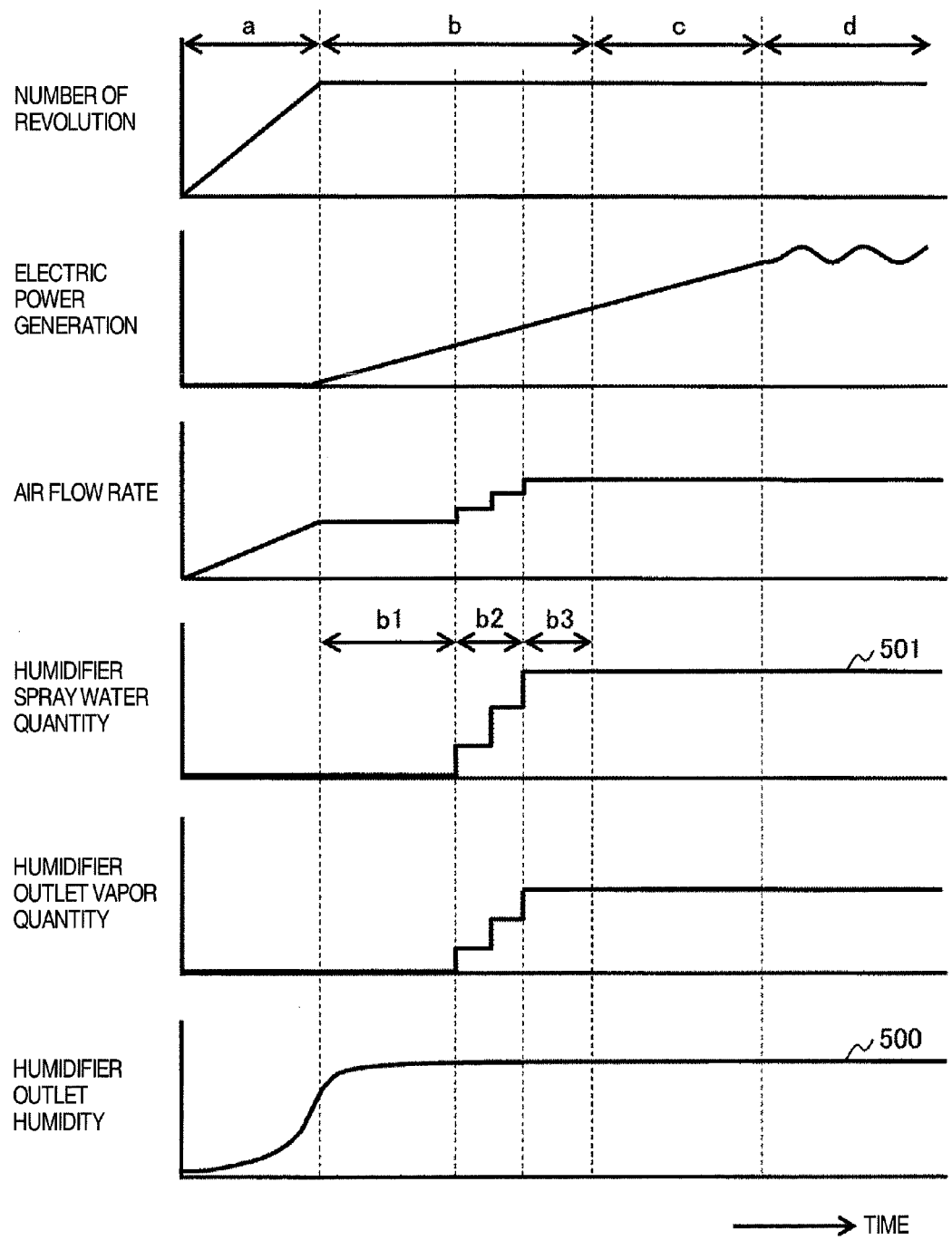
FIG. 11 is a characteristics graph representing an example of the operating method of a humid air gas turbine system provided with a gas turbine combustor according to a second embodiment of the invention.

FIG. 11 is a characteristics graph showing an example of the operating method of the humid air gas turbine according to the second embodiment of the invention, the characteristics graph of FIG. 11 corresponding to the characteristics graph of FIG. 4 of the first embodiment.

A difference between the fuel flow control system of the gas turbine combustor of the embodiment provided in a humid air gas turbine and the fuel flow control system of the gas turbine combustor of the first embodiment provided in a humid air gas turbine resides in that humidifier outlet humidity in a humidifier 4 is not evaluated directly, but humidifier outlet vapor quantity $G_{vh, exit}$ in the humidifier 4 is first found and combustion air humidity is calculated from humidifier outlet vapor quantity $G_{vh, exit}$ thus found.

Humidifier outlet humidity $Hm_{h, exit}$ in the humidifier 4 can be evaluated with high accuracy by evaluating combustion air humidity from humidifier outlet vapor quantity $G_{vh, exit}$.

Figure 12:
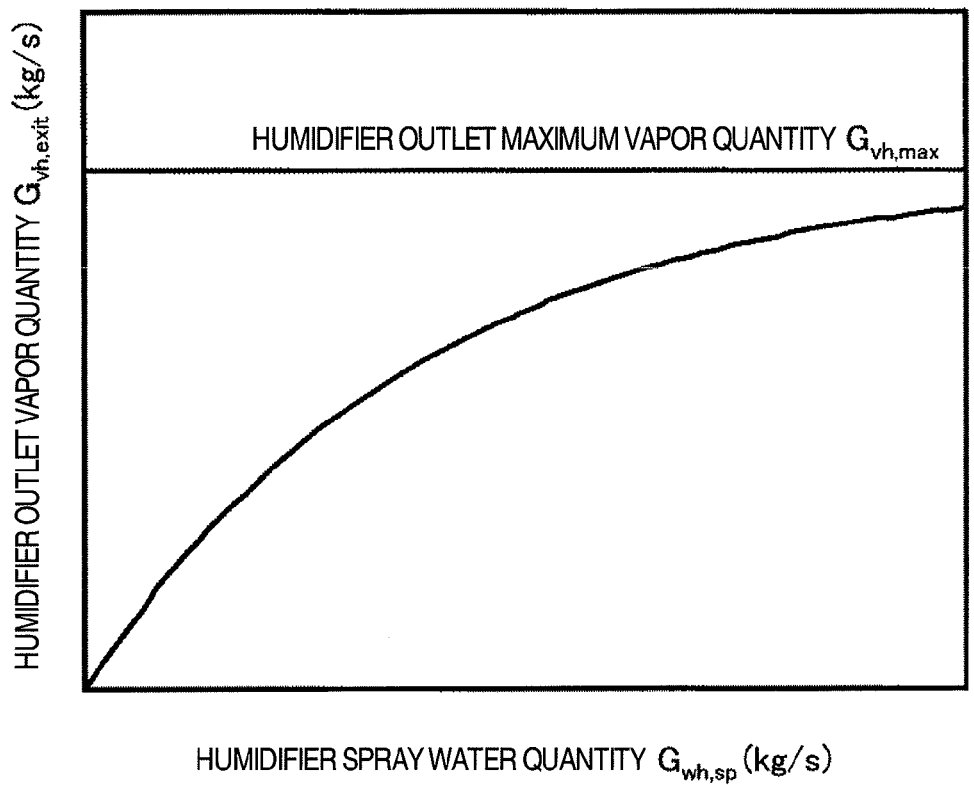
FIG. 12 is a schematic diagram showing the relationship between humidifier spray water quantity and humidifier outlet humidity in the humid air gas turbine system provided with the gas turbine combustor of the second embodiment of the invention.

FIG. 12 is a schematic diagram showing the relationship between humidifier spray water quantity $G_{wh, sp}$ and humidifier outlet vapor quantity $G_{vh, exit}$ in the humidifier 4 in a humid air gas turbine system provided with the gas turbine combustor of the embodiment. The schematic diagram of FIG. 12 shows a curve, along which humidifier outlet humidity $Hm_{h, exit}$ comes close to humidifier outlet maximum humidity $Hm_{h, max}$ when humidifier spray water quantity $G_{wh, sp}$ increases.

In the humid air gas turbine according to the embodiment, it is thought likewise in the schematic diagram of FIG. 12 that when humidifier spray water quantity $G_{wh, sp}$ increases, humidifier outlet vapor quantity $G_{vh, exit}$ comes close to humidifier outlet maximum vapor quantity $G_{vh, max}$.

Under an ideal condition, humidifier outlet maximum vapor quantity $G_{vh, max}$ in the humidifier 4 makes saturated vapor quantity $G_{vh, sat}$ relative to humidifier outlet flow rate and temperature. For example, humidifier outlet vapor quantity $G_{vh, exit}$ in the humidifier 4 is proportional to humidifier outlet maximum vapor quantity $G_{vh, max}$ and is given by a function proportional to a difference between a unit quantity and an exponential function value, of which a variable is a value obtained by multiplying humidifier spray water quantity $G_{wh, sp}$ by a minus proportional constant.

Specifically, the relationship between humidifier spray water quantity $G_{wh, sp}$ and humidifier outlet vapor quantity $G_{vh, exit}$ in the humidifier 4 is represented by the formula (1).

$$G_{vh, exit} = G_{vh, max}(1 - \exp(-C \cdot G_{wh, sp})) \quad (1)$$

Here, C is a constant.

Figure 13:
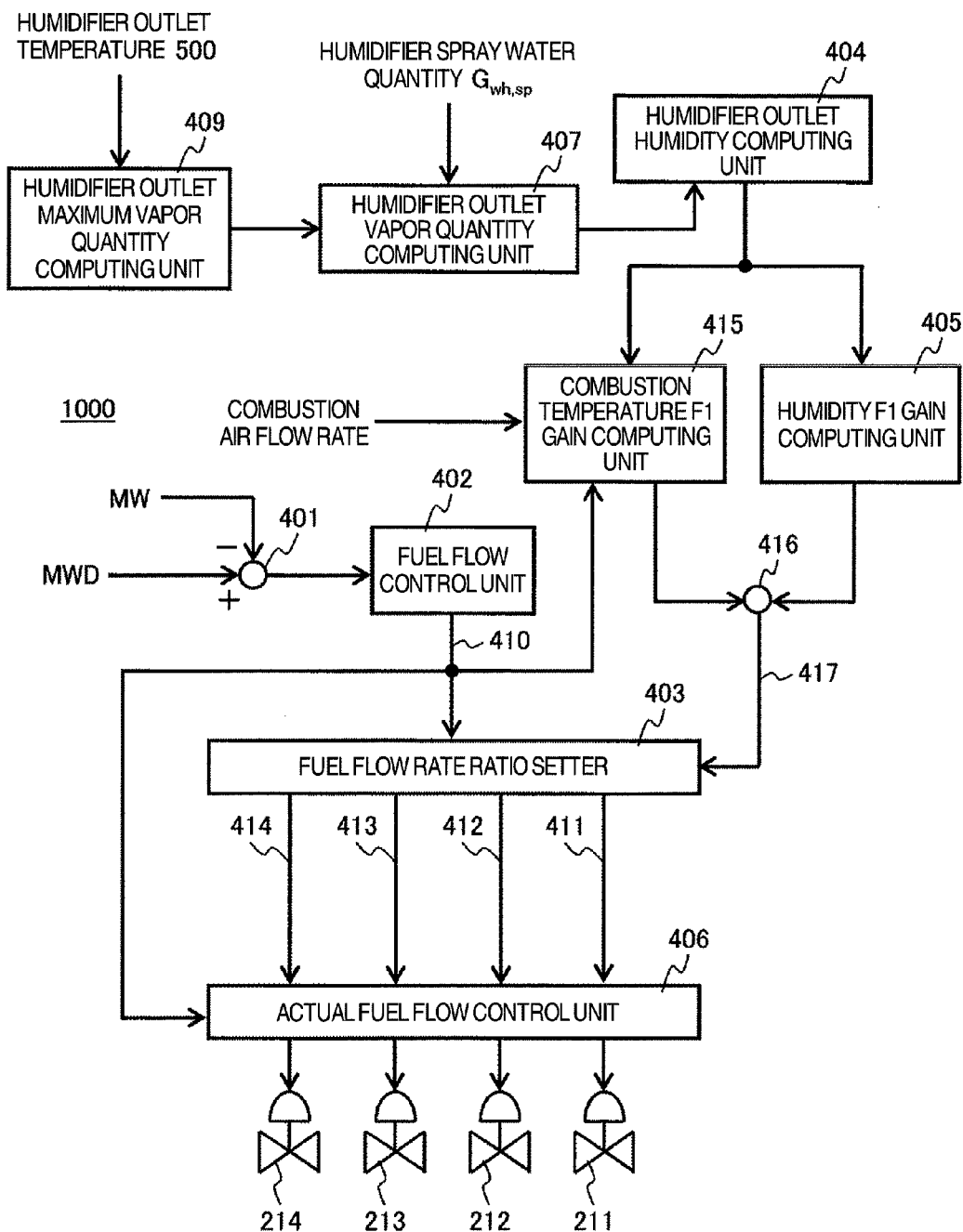
FIG. 13 is a control block diagram showing an example of a control unit constituting a combustion control system of the gas turbine combustor, according to the second embodiment of the invention, provided in a humid air gas turbine.

FIG. 13 shows an example of a concrete control block constituting a control unit 1000 in the fuel flow control system of the gas turbine combustor 2 of the embodiment provided in a humid air gas turbine.

In the control unit 1000 in the fuel flow control system of the gas turbine combustor 2 of the embodiment shown in FIG. 13, a humidifier outlet maximum vapor quantity computing unit 409 inputs thereinto humidifier outlet temperature 500 measured by a thermometer provided at the outlet of the humidifier 4 to calculate humidifier outlet maximum vapor quantity $G_{vh, max}$ and a humidifier outlet vapor quantity computing unit 407 calculates humidifier outlet vapor quantity $G_{vh, exit}$ from humidifier outlet maximum vapor quantity $G_{vh, max}$ calculated by the humidifier outlet maximum vapor quantity computing unit 409 and humidifier spray water quantity $G_{wh, sp}$ being humidifier spray water quantity 301 sprayed to the humidifier 4.

Humidifier outlet vapor quantity $G_{vh, exit}$ calculated by the humidifier outlet vapor quantity computing unit 407 is input into the humidifier outlet humidity computing unit 404. The remaining constitution of the control block is the same as that of the control unit 1000 of the first embodiment shown in FIG. 9.

Thus the fuel flow control system of the gas turbine combustor of the embodiment provided in a humid air gas turbine enables finding F1 gain required for stable combustion with respect to combustion air humidity, which varies every moment, in the same manner as in the first embodiment and further evaluating humidity of combustion air, which flows into the gas turbine combustor, with high accuracy, thereby enabling realizing a highly reliable operation, in which a low NOx and stable combustion are made further exactly compatible with each other.

Accordingly, according to the embodiment, a fuel flow control method and a fuel flow control system of a gas turbine combustor provided in a humid air gas turbine, which are capable of operation in high reliability before humidification, before and after the starting of humidification, and during humidification without damage in combustion stability and of maintaining a NOx yield in low level irrespective of a humidified condition, can be realized in a humid air gas turbine for humidification of air with the use of a spray type humidifier.

(Embodiment 3)

A fuel flow control method and a fuel flow control system of a gas turbine combustor, according to a third embodiment of the invention, provided in a humid air gas turbine will be described with reference to FIGS. 14 to 18.

Since a fuel flow control system of the gas turbine combustor of the embodiment provided in a humid air gas turbine is common in fundamental constitution to the fuel flow control system of the gas turbine combustor of the first embodiment provided in a humid air gas turbine and shown in FIGS. 1 to 10, descriptions of the constitution and function common to the both are omitted and a different portion will be described below.

Figure 14:
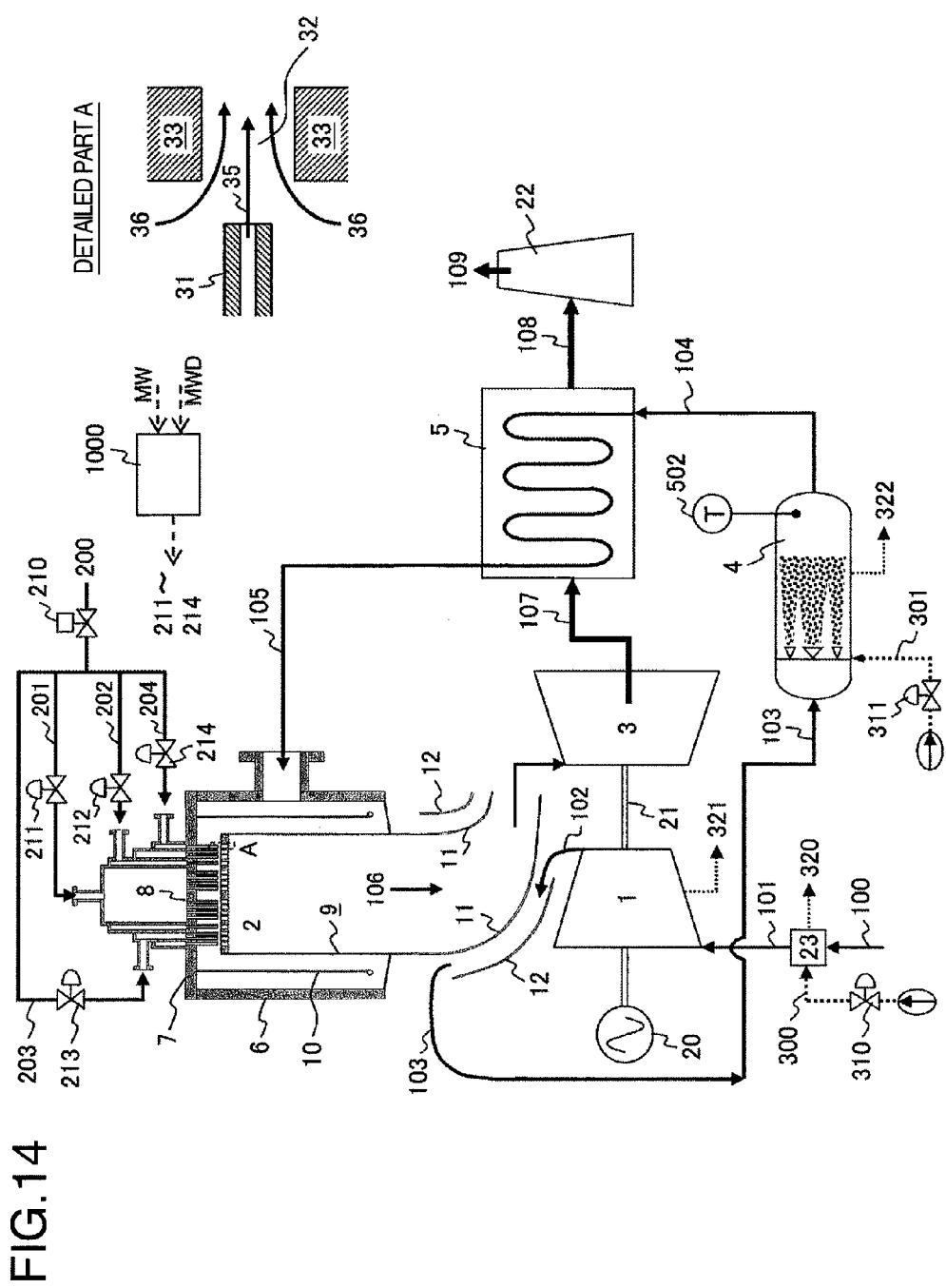
FIG. 14 is a configuration showing a humid air gas turbine system provided with a gas turbine combustor according to a third embodiment of the invention.

FIG. 14 is a system flow diagram showing the whole constitution of the humid air gas turbine system according to the third embodiment of the invention and a difference between the humid air gas turbine system of the embodiment and the fuel flow control system of the first embodiment resides in that an intake spray device 23 sprays water onto gas turbine intake air 100, the intake air being compressed by a compressor 1 as intake air 101 after water spraying.

In the humid air gas turbine system according to the embodiment, the intake spray device 23 sprays water onto intake air to thereby enable sharply reducing compression power of the compressor 1.

In the humid air gas turbine system according to the embodiment, unhumidified high temperature air 103 flows into the humidifier 4 in a state of being humidified in the intake spray device 23 unlike the first embodiment. Accordingly, in the case where unhumidified high temperature air 103 has already been humidified, it is necessary to catch how humidified air 104 humidified in the humidifier 4 varies in humidity relative to flow rate of humidifier spray water 301 sprayed into the humidifier 4.

An example of the operating method of a humid air gas turbine system, to which the fuel flow control method and the fuel flow control system of the gas turbine combustor 2, according to the embodiment, shown in FIG. 14 are applied, will be described with reference to graphs shown in FIGS. 15 and 16.

Figure 15:
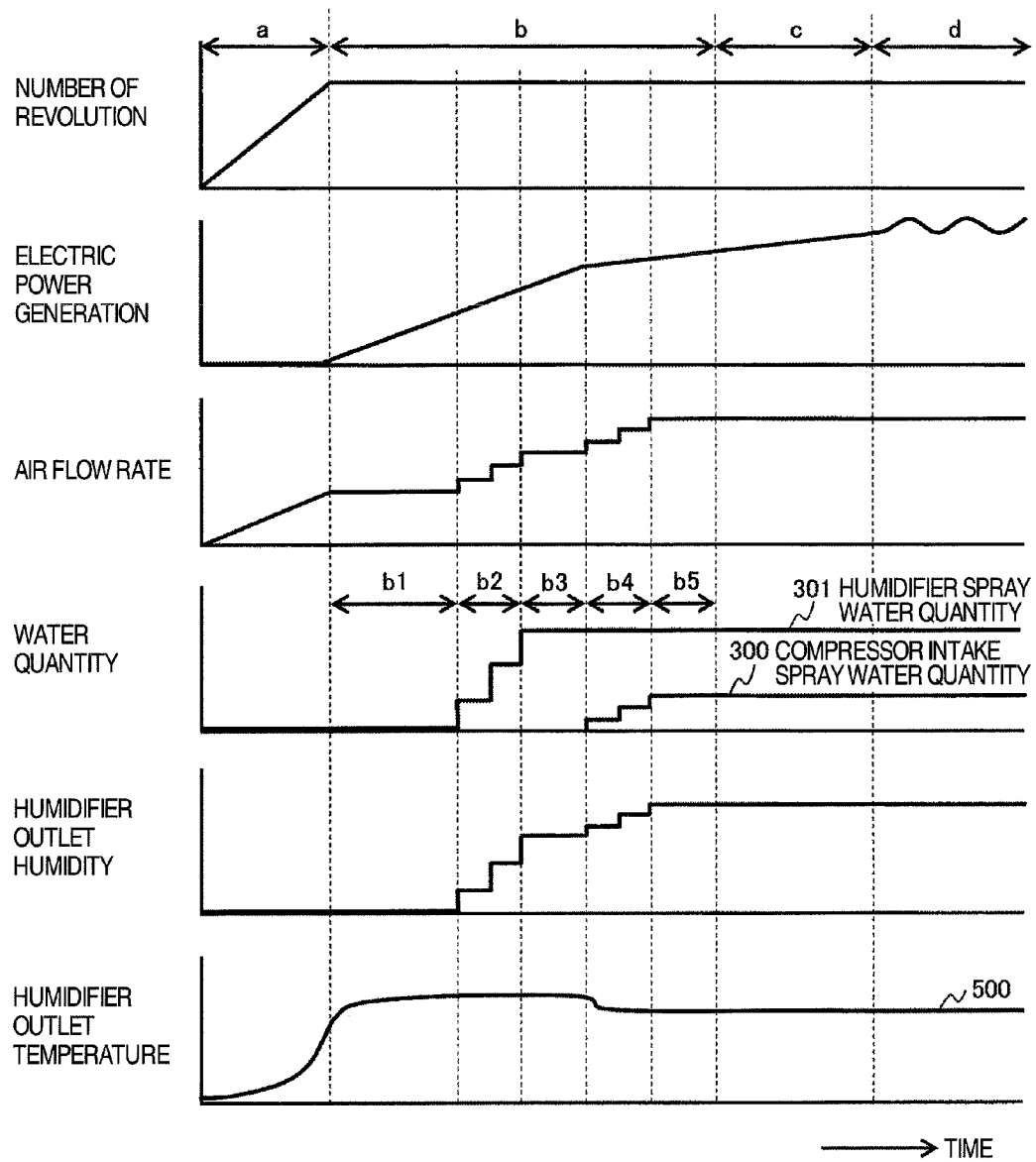
FIG. 15 is a characteristics graph representing an example of the operating method of the humid air gas turbine system provided with the gas turbine combustor according to the third embodiment of the invention.

In the characteristics graph of FIG. 15 for the operating method of the humid air gas turbine, an axis of abscissas indicates time from starting as in FIG. 4 and an axis of ordinate indicates number of revolution, electric power generation, air flow rate, spray water quantity (humidifier spray water quantity 301 and compressor intake spray water quantity 300), humidifier outlet humidity of the humidifier 4, and humidifier outlet temperature 500 of the humidifier 4, respectively, in order from the top.

Figure 16:
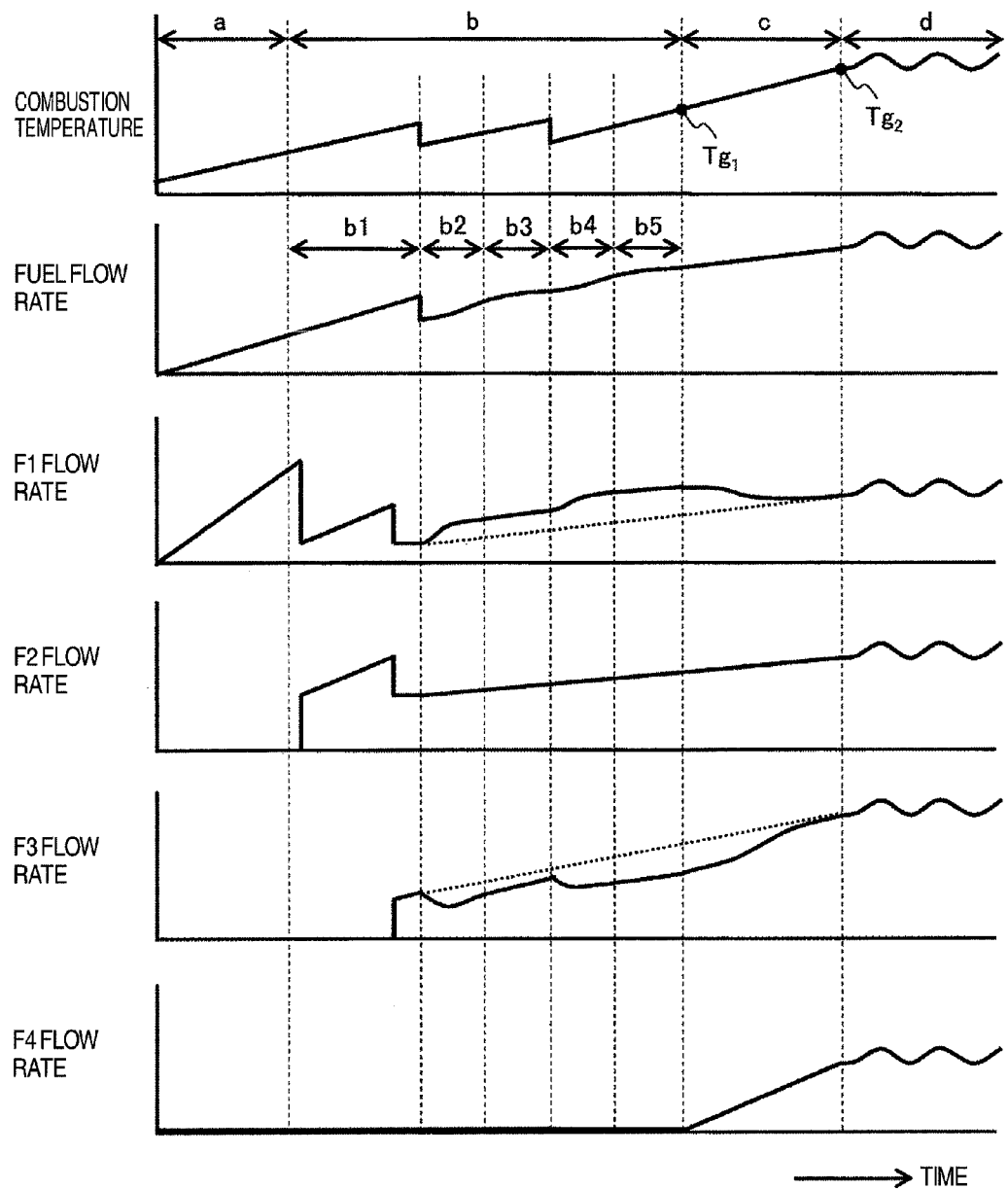
FIG. 16 is a characteristics graph representing another example of the operating method of the humid air gas turbine system provided with the gas turbine combustor according to the third embodiment of the invention.

In the characteristics graph of FIG. 16 for the operating method of the humid air gas turbine, an axis of abscissas indicates time from starting as in FIG. 15 and an axis of ordinate schematically indicates combustion temperature of the gas turbine combustor 2, whole fuel flow rate of the gas turbine combustor 2, and respective fuel flow rates (F1 flow rate to F4 flow rate) of respective fuel lines 201 to 204, through which fuel is supplied to F1 to F4 burners, in order from the top.

In the characteristics graphs of FIG. 15 and FIG. 16, time a indicates revolution increasing time from starting to attainment of rated revolution, time b indicates load increasing time in starting of the gas turbine, and time c indicates load-following operation time after termination of starting.

The load increasing time b is divided into non-humidification time b1, humidification varying time b2 in the humidifier 4, humidification constant time b3 in the humidifier 4, spray water quantity varying time b4 in the intake spray device 23, and spray water quantity constant time b5 in the intake spray device 23, respectively.

Time (time b1 to time b3 in FIG. 4) elapsed until humidification is made constant after humidification is started in the humidifier 4 is the same as that in the first embodiment of the invention.

In the operating method of the humid air gas turbine of the embodiment, intake spraying is started in the intake spray device 23 after humidification is made constant in the humidifier 4. A intake spraying starting command opens an intake spray water quantity control valve 310, feed water of flow rate conformed to the opening degree is supplied to the intake spray device 23 to stepwise increase intake spray water quantity (time b4), and spray water quantity is regulated so as to assume a predetermined value (time b4 to time b5).

A manner, in which the ratio of F1 flow rate in the gas turbine combustor 2 of the embodiment provided in a humid air gas turbine to a change in humidity is increased to raise F1 combustion temperature, thus making the gas turbine combustor 2 stable in combustion, is the same as that in the first embodiment of the invention.

Also, in the operating method of the humid air gas turbine of the embodiment, a similar relationship to that shown in the schematic diagram of FIG. 6 is established between humidifier spray water quantity $G_{wh,\ sp}$ and humidifier outlet humidity $Hm_{h,\ exit}$ in the humidifier 4 in the same manner as that in the first embodiment of the invention.

Figure 17:
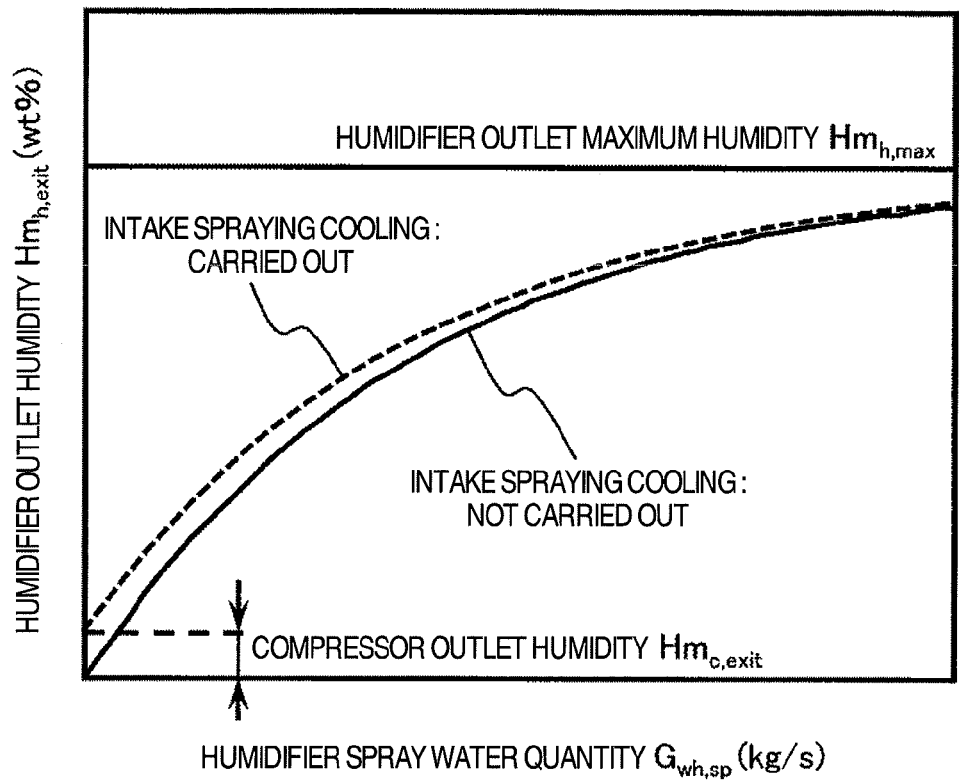
FIG. 17 is a schematic diagram showing the relationship between humidifier spray water quantity and humidifier outlet humidity in the humid air gas turbine system provided with the gas turbine combustor according to the third embodiment of the invention.

FIG. 17 shows a schematic diagram showing the relationship between humidifier spray water quantity $G_{wh,\ sp}$ and humidifier outlet humidity $Hm_{h,\ exit}$ in the humidifier 4 in the operating method of the humid air gas turbine of the embodiment.

In the schematic diagram of FIG. 17, humidifier outlet humidity $Hm_{h,\ exit}$ indicated by a dotted line is humidifier outlet humidity $Hm_{h,\ exit}$ in the case where intake spraying cooling is carried out, and humidifier outlet humidity $Hm_{h,\ exit}$ indicated by a solid line is humidifier outlet humidity $Hm_{h,\ exit}$ in the case where intake spraying cooling is not carried out, the schematic diagram corresponding to FIG. 6 related to the first embodiment of the invention.

In the operating method of the humid air gas turbine of the embodiment, unhumidified high temperature air 103 is humidified by the intake spray device 23, so that when humidifier spray water quantity $G_{wh,\ sp}$ for the humidifier 4 is zero, humidifier outlet humidity $Hm_{h,\ exit}$ in the humidifier 4 is not made zero as indicated by the dotted line in FIG. 17. That is, when humidifier spray water quantity $G_{wh,\ sp}=0$, humidifier outlet humidity $Hm_{h,\ exit}$ is equal to compressor outlet humidity $Hm_{c,\ exit}$.

Humidifier outlet humidity $Hm_{h,\ exit}$ is a change in humidity, which is caused by humidification from an intake part of the compressor 1, in which the intake spray device 23 is included, to a discharge part of the compressor 1.

The relationship, shown in the schematic diagram of FIG. 17, between humidifier spray water quantity $G_{wh,\ Sp}$ and humidifier outlet humidity $Hm_{h,\ exit}$ for the humidifier 4 can be found by means of an actual measurement value put into data base or a calculating formula, in which humidification is simulated, in the same manner as that shown in FIG. 6.

Figure 18:
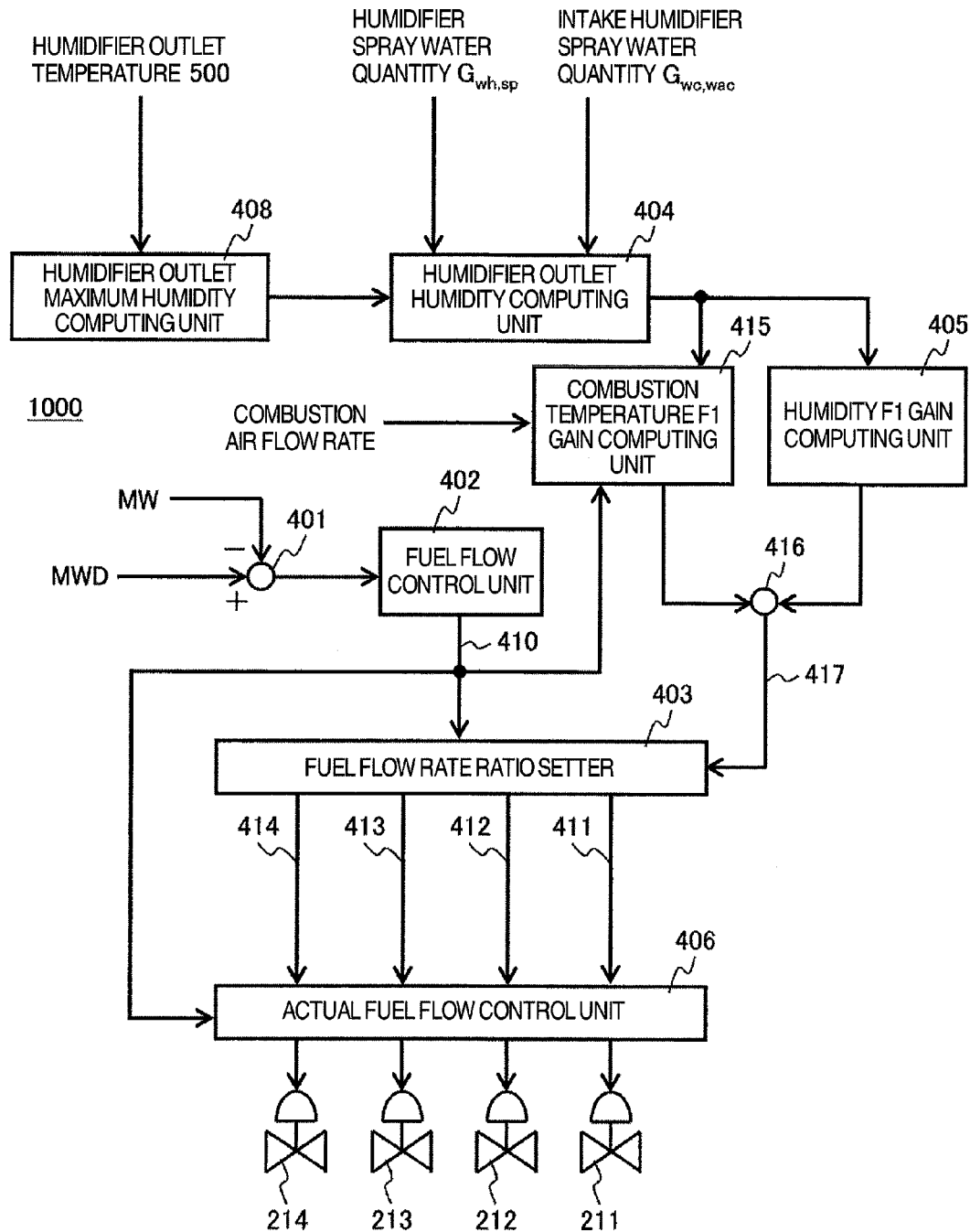
FIG. 18 is a control block diagram showing an example of a control unit constituting a combustion control system of the gas turbine combustor, according to the third embodiment of the invention, provided in a humid air gas turbine system.

FIG. 18 shows an example of a concrete control block constituting a control unit 1000 in the fuel flow control system of the gas turbine combustor 2 of the embodiment provided in a humid air gas turbine.

A difference between the control unit 1000 and the control unit in the fuel flow control system of the gas turbine combustor 2 of the first embodiment resides in that in a humid air gas turbine system, in which the intake spray device 23 is provided upstream of the compressor 1, compressor outlet humidity $Hm_{c,\ exit}$ is changed by the operating condition of the intake spray device 23, that is, intake spray water quantity $G_{wc,\ wac}$.

A humidifier outlet maximum humidity computing unit 408 provided in the control unit 1000 of the embodiment inputs thereinto humidifier outlet temperature 500 measured by a thermometer provided at the outlet of the humidifier 4 to calculate humidifier outlet maximum humidity $Hm_{h,\ max}$, and a humidifier outlet humidity computing unit 404 calculates humidifier outlet humidity $Hm_{h,\ exit}$ from the humidifier outlet maximum humidity $Hm_{h,\ max}$ calculated by the humidifier outlet maximum humidity computing unit 408, humidifier spray water quantity $G_{h,\ Sp}$, which is humidifier spray water quantity 301 sprayed into the humidifier 4, and intake spray device spray water quantity $G_{wc,\ wac}$ sprayed from the intake spray device 23, thus coping with variation in the compressor outlet humidity $Hm_{c,\ exit}$.

Humidifier outlet humidity $Hm_{h,\ exit}$ calculated by the humidifier outlet humidity computing unit 404 calculates the humidifier outlet humidity $Hm_{h,\ exit}$ taking account of not only humidifier spray water quantity $G_{wh,\ sp}$ but also intake spray device spray water quantity $G_{wc,\ wac}$ to enable evaluating combustion air humidity with a higher accuracy even in a humid air gas turbine system provided with the intake spray device 23. The remaining constitution of the control block is the same as that in the control unit 1000 of the first embodiment shown in FIG. 9.

Thus the fuel flow control system of the gas turbine combustor of the embodiment provided in a humid air gas turbine enables finding F1 gain required for stable combustion for combustion air humidity, which varies every moment, in the same manner as in the first embodiment and further evaluating humidity of combustion air, which flows into the gas turbine combustor, with high accuracy, thereby enabling realizing a highly reliable operation, in which a low NOx and stable combustion are made further exactly compatible with each other.

In the embodiment, intake spraying is started in the intake spray device 23 after humidification is made constant in the humidifier 4 as shown in FIG. 15, but humidification can be started in the humidifier 4 after intake spraying is started to make intake spraying water quantity constant. Even in this case, the same fuel flow control method of the gas turbine combustor as that in the embodiment is applicable. In summer, in which atmospheric temperature rises, reduction in compressive power owing to intake spraying is especially effective.

Thus, according to the embodiment, a fuel flow control method and a fuel flow control system of a gas turbine combustor provided in a humid air gas turbine, which are capable of operation in high reliability before humidification, before and after the starting of humidification, and during humidification without damage in combustion stability and of maintaining a NOx yield in low level irrespective of a humidified condition, can be realized in a humid air gas turbine for humidification of air with the use of a spray type humidifier.
(Embodiment 4)

Subsequently, a fuel flow control method and a fuel flow control system of a gas turbine combustor, according to a fourth embodiment of the invention, provided in a humid air gas turbine will be described with reference to FIGS. 19 to 21.

Since a fuel flow control system of the gas turbine combustor of the embodiment provided in a humid air gas turbine is common in fundamental constitution to the fuel flow control system of the gas turbine combustor of the third embodiment provided in a humid air gas turbine and shown in FIGS. 14 to 18, descriptions of the constitution and function common to the both are omitted and a different portion will be described below.

Figure 19:
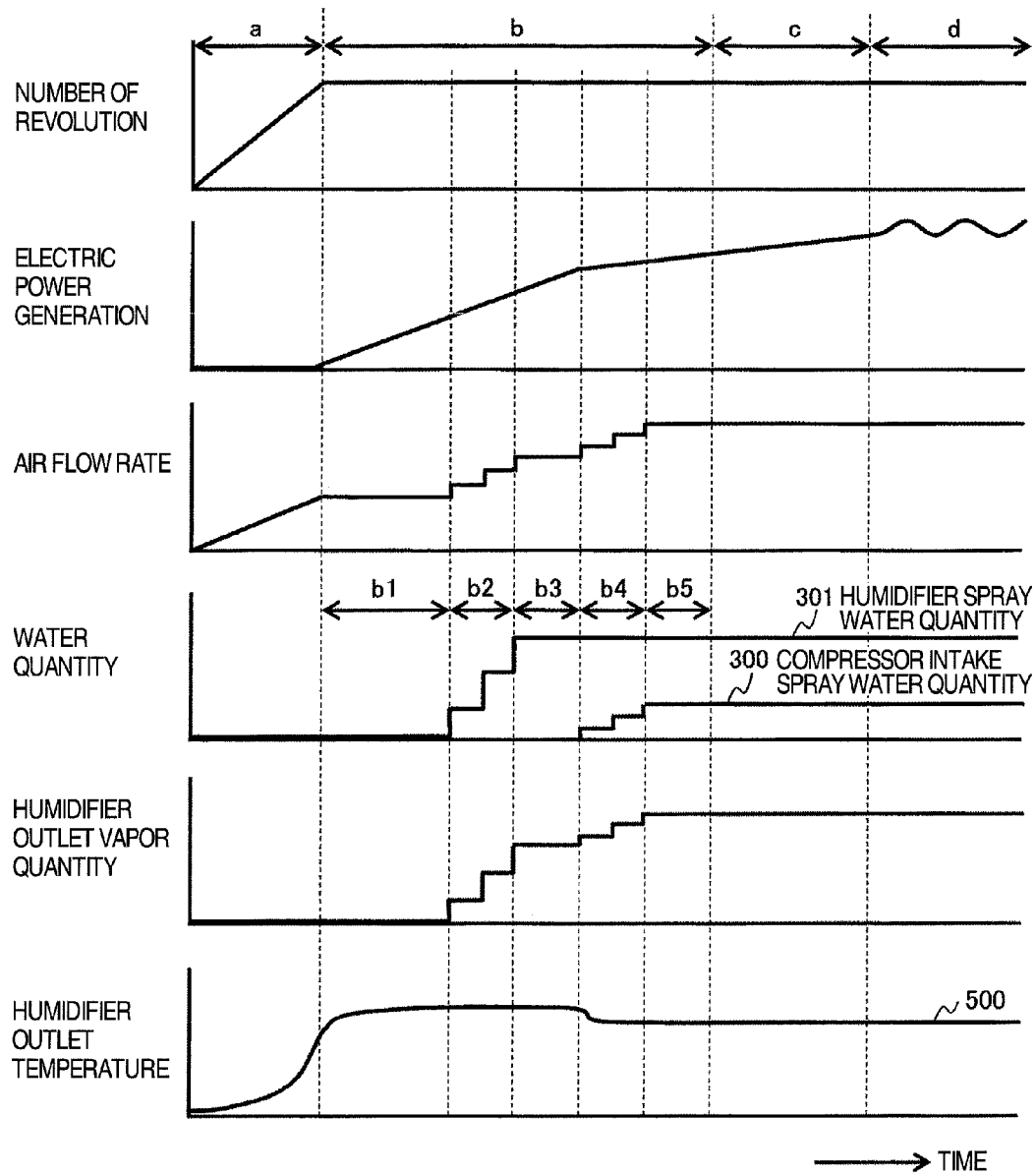
FIG. 19 is a characteristics graph representing an example of the operating method of a humid air gas turbine system provided with a gas turbine combustor according to a fourth embodiment of the invention.

FIG. 19 is a characteristics graph showing an example of the operating method of the humid air gas turbine according to the fourth embodiment of the invention, the characteristics graph of FIG. 19 corresponding to the characteristics graph of FIG. 15 in the third embodiment. The humid air gas turbine according to the embodiment is the same in constitution as that of the humid air gas turbine, according to the third embodiment, shown in FIG. 14.

A difference between the fuel flow control system of the gas turbine combustor of the embodiment provided in a humid air gas turbine and the fuel flow control system of the gas turbine combustor of the third embodiment of the invention provided in a humid air gas turbine resides in that humidifier outlet humidity in a humidifier 4 is not evaluated directly in the same manner as in the second embodiment of the invention, but humidifier outlet vapor quantity $G_{vh,\ exit}$ in the humidifier 4 is first found and combustion air humidity is calculated from the humidifier outlet vapor quantity $G_{vh,\ exit}$ thus found.

In the operating method of the humid air gas turbine according to the embodiment, humidifier outlet humidity $Hm_{h,\ exit}$ in the humidifier 4 is evaluated with high accuracy by evaluating combustion air humidity from humidifier outlet vapor quantity $G_{vh,\ exit}$ in the same manner as in the second embodiment of the invention.

Figure 20:
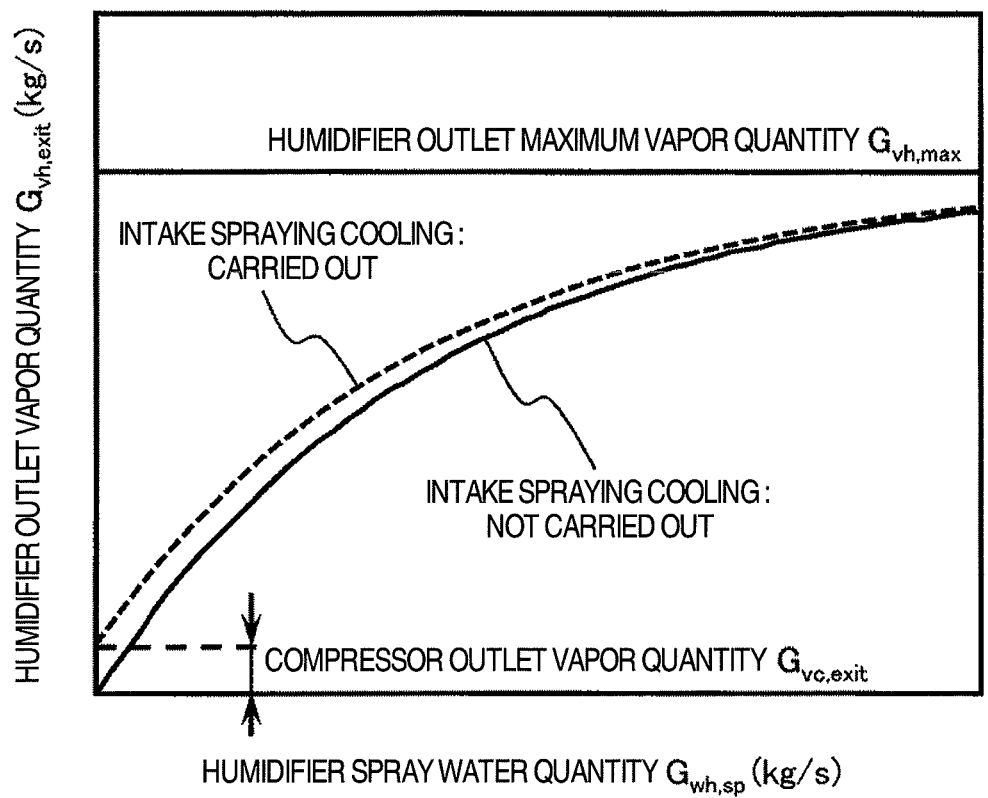
FIG. 20 is a schematic diagram showing the relationship between humidifier spray water quantity and humidifier outlet humidity in the humid air gas turbine system provided with the gas turbine combustor according to the fourth embodiment of the invention.

FIG. 20 is a schematic diagram showing the relationship between humidifier spray water quantity $G_{wh,\ sp}$ and humidifier outlet vapor quantity $G_{vh,\ exit}$ in the humidifier 4 in a humid air gas turbine system provided with the gas turbine combustor of the embodiment.

The characteristics graph of FIG. 20 shows a curve, along which humidifier outlet vapor quantity $G_{vh,\ exit}$ comes close to humidifier outlet maximum vapor quantity $G_{vh,\ max}$ when humidifier spray water quantity $G_{wh,\ sp}$ increases.

In the schematic diagram of FIG. 20, humidifier outlet vapor quantity $G_{vh,\ exit}$ indicated by a dotted line is humidifier outlet vapor quantity $G_{vh,\ exit}$ in the case where intake spraying cooling is carried out, and humidifier outlet vapor quantity $G_{vh,\ exit}$ indicated by a solid line is humidifier outlet vapor quantity $G_{vh,\ exit}$ in the case where intake spraying cooling is not carried out, the schematic diagram corresponding to FIG. 12 related to the second embodiment of the invention.

In the operating method of the humid air gas turbine according to the embodiment, when humidifier spray water quantity $G_{wh,\ sp}$ increases, humidifier outlet vapor quantity $G_{vh,\ exit}$ comes close to humidifier outlet maximum vapor quantity $G_{vh,\ max}$ in the same manner as in the second embodiment of the invention. Under an ideal condition, humidifier outlet maximum vapor quantity $G_{vh,\ max}$ makes saturated vapor quantity $G_{vh,\ sat}$ relative to humidifier outlet flow rate of the humidifier 4 and outlet temperature 500 of the humidifier 4.

In the operating method of the humid air gas turbine of the embodiment, in the same manner as in the third embodiment of the invention, unhumidified high temperature air 103 is humidified by the intake spray device 23, so that when humidifier spray water quantity $G_{wh,\ sp}$ for the humidifier 4 is zero, humidifier outlet vapor quantity $G_{vh,\ exit}$ in the humidifier 4 is not made zero as indicated by the dotted line in FIG. 20.

That is, when humidifier spray water quantity $G_{wh,\ sp}=0$, humidifier outlet vapor quantity $G_{vh,\ exit}$ is equal to compressor outlet vapor quantity $G_{vc,\ exit}$.

Here, compressor outlet vapor quantity $G_{vc,\ exit}$ is vapor quantity given by humidification from an intake part of the compressor 1, in which the intake spray device 23 is included, to a discharge part of the compressor 1.

For example, humidifier outlet vapor quantity $G_{vh,\ exit}$ is proportional to humidifier outlet maximum vapor quantity $G_{vh,\ max}$ and is given by a function proportional to a difference between a unit quantity and an exponential function value, of which a variable is given by a value obtained by multiplying the sum of humidifier spray water quantity $G_{wh,\ sp}$ and humidifier spray water quantity corrected quantity $G_{wh,\ sp\_cor}$ by a minus proportional constant. Specifically, the relationship between humidifier spray water quantity $G_{wh,\ sp}$ and humidifier outlet vapor quantity $G_{vh,\ exit}$ is represented by the formula (2).

$$G_{vh,\ exit} = G_{vh,\ max}(1-\exp(-C \cdot (G_{wh,\ sp}+G_{wh,\ sp\_cor}))) \quad (2)$$

Here, C is a constant and $G_{wh,\ sp\_cor}$ is a correction term taking account of humidification in the intake spray device 23. That is, humidifier spray water quantity required for realizing humidification corresponding to compressor outlet vapor quantity $G_{vc,\ exit}$ in the humidifier 4 is humidifier spray water quantity corrected quantity $G_{wh,\ sp\_cor}$.

Figure 21:
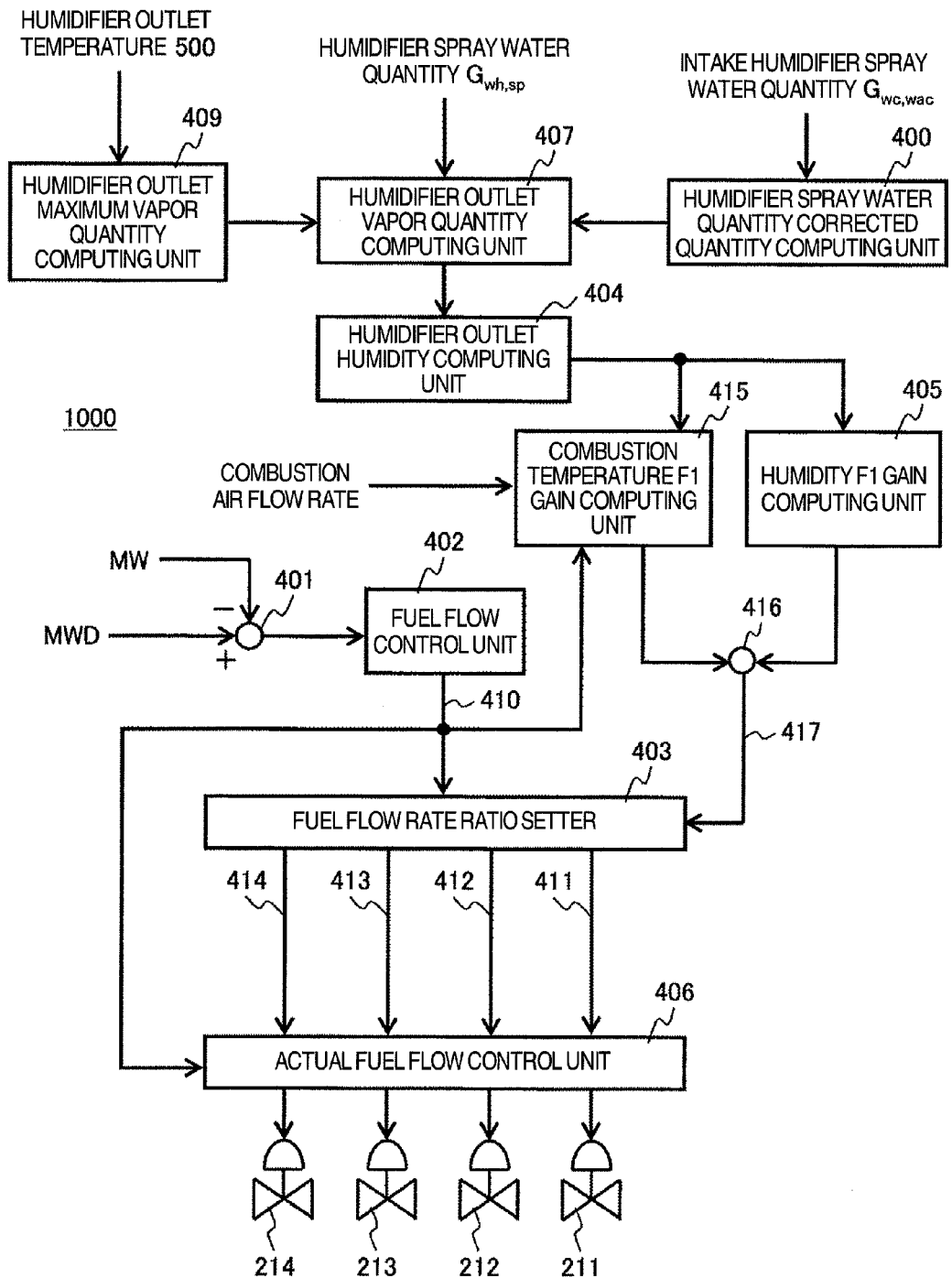
FIG. 21 is a control block diagram showing an example of a control unit constituting a combustion control system of the gas turbine combustor, according to the fourth embodiment of the invention, provided in a humid air gas turbine.

FIG. 21 shows an example of a concrete control block constituting the control unit 1000 in the fuel flow control system of the gas turbine combustor 2 of the embodiment provided in a humid air gas turbine.

A difference between the control unit 1000 of the fuel flow control system and the control unit of the fuel flow control system of the second embodiment resides in that in the present embodiment, a humidifier spray water quantity corrected quantity computing unit 400 calculates humidifier spray water quantity corrected quantity $G_{wh, \ sp\_cor}$ from intake spray device spray water quantity $G_{wc, \ wac}$ sprayed from the intake spray device 23.

A humidifier outlet vapor quantity computing unit 407 calculates humidifier outlet vapor quantity $G_{vh, \ exit}$ from humidifier outlet maximum vapor quantity $G_{vh, \ max}$ calculated by a humidifier outlet maximum vapor quantity computing unit 409, into which humidifier outlet temperature 500 is input, humidifier spray water quantity $G_{wh, sp}$ sprayed in the humidifier 4, and humidifier spray water quantity corrected quantity $G_{wh, \ sp\_cor}$ calculated by the humidifier spray water quantity corrected quantity computing unit 400, and the humidifier outlet vapor quantity $G_{vh, \ exit}$ calculated by the humidifier outlet vapor quantity computing unit 407 is input into a humidifier outlet humidity computing unit 404 for calculation of humidifier outlet humidity $Hm_{h, \ exit}$.

Thus combustion air humidity can be evaluated with a higher accuracy even in a humid air gas turbine system provided with the intake spray device 23 by using the humidifier outlet vapor quantity computing unit 407 to calculate humidifier outlet maximum vapor quantity $G_{vh, \ max}$ taking account of not only humidifier outlet maximum vapor quantity $G_{vh, \ max}$ and humidifier spray water quantity $G_{wh, \ sp}$ but also humidifier spray water quantity corrected quantity $G_{wh, \ sp\_cor}$ based on intake spray device spray water quantity $G_{wc, \ wac}$. The remaining constitution of the control block is the same as that of the control unit 1000 of the second embodiment shown in FIG. 13.

Thus the fuel flow control system of the gas turbine combustor of the embodiment provided in a humid air gas turbine enables finding F1 gain required for stable combustion for combustion air humidity, which varies every moment, in the same manner as in the first embodiment and further evaluating humidity of combustion air, which flows into the gas turbine combustor, with high accuracy, thereby enabling realizing a highly reliable operation, in which a low NOx and stable combustion are made further exactly compatible with each other.

Accordingly, according to the embodiment, a fuel flow control method and a fuel flow control system of a gas turbine combustor provided in a humid air gas turbine, which are capable of operation in high reliability before humidification, before and after the starting of humidification, and during humidification without damage in combustion stability and of maintaining a NOx yield in low level irrespective of a humidified condition, can be realized in a humid air gas turbine for humidification of air with the use of a spray type humidifier.

The invention is applicable to a fuel flow control method and a fuel flow control system of a gas turbine combustor provided in a humid air gas turbine, which makes use of highly humid air.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel flow control method of a gas turbine combustor provided in a humid air gas turbine comprising a compressor, the gas turbine combustor, in which a fuel is burned with the use of a compressed air compressed by the compressor to generate a combustion gas, a turbine driven by the combustion gas generated in the gas turbine combustor, and a humidifier for humidifying the compressed air compressed by the compressor and supplied to the gas turbine combustor, the gas turbine combustor comprising a plurality of combustion sections, each of the combustion sections including a plurality of fuel nozzles for supplying the fuel and a plurality of air flow passages for supplying a combustion air, the combustion air being at least a part of the compressed air, a part of the plurality of combustion sections provided in the gas turbine combustor being formed into at least one combustion section that has better flame holding performance than the remaining combustion sections, wherein fuel ratios of fuels, respectively, supplied to the plurality of combustion sections of the gas turbine combustor are controlled based on deviation between a load command and electric power generation, the method comprising controlling a fuel flow rate to the combustion sections in the gas turbine combustor through evaluating a moisture content in the combustion air supplied to the gas turbine combustor based on a humidification water quantity and an air temperature after humidification in the humidifier; calculating an air-fuel ratio, using a combustion air flow rate supplied to the gas turbine combustor, to evaluate a combustion temperature in the combustion sections; and regulating a fuel ratio of the fuel flow rate supplied to the at least one combustion section and the fuel flow rate supplied to the remaining combustion sections based on the evaluation of a moisture content and the evaluation of a combustion temperature.

2. The fuel flow control method of a gas turbine combustor provided in a humid air gas turbine, according to claim 1, wherein the fuel ratio of the fuel supplied to the at least one combustion section is controlled on the basis of an increase in moisture content of combustion air supplied to the at least one combustion section, which is humidified by the humidifier, so that an air-fuel ratio in the at least one combustion section is increased relative to an air-fuel ratio in the remaining combustion sections.

3. The fuel flow control method of a gas turbine combustor provided in a humid air gas turbine, according to claim 2, wherein the fuel ratio of the fuel supplied to the at least one combustion section is controlled based on an increase in moisture content of the combustion air supplied to the at least one combustion section, which is humidified by the humidifier, so that an air-fuel ratio in the at least one combustion section is increased relative to an air-fuel ratio in the remaining combustion sections so that the combustion temperature in the at least one combustion section is made constant.

4. The fuel flow control method of a gas turbine combustor provided in a humid air gas turbine, according to claim 2, wherein the fuel ratio of the fuel supplied to the at least one combustion section is controlled on the basis of an increase in moisture content of the combustion air supplied to the at least one combustion section, which is humidified by the humidifier, so that the moisture content is increased relative to the fuel supplied to the remaining combustion sections so that the at least one combustion section increases in temperature.

5. The fuel flow control method of a gas turbine combustor provided in a humid air gas turbine, according to claim 1, wherein a moisture content in combustion air increases monotonously relative to a humidification water quantity supplied to the compressed air and further comprising evaluating a moisture content of the combustion air in a range of a moisture content upper limit of a combustion air with an increase in humidification water quantity and controlling the fuel ratio of the fuel supplied to the at least one combustion section on the basis of the evaluation of moisture content of the combustion air.

6. The fuel flow control method of a gas turbine combustor provided in a humid air gas turbine, according to claim 2, wherein a first set temperature is provided for combustion temperature in the at least one combustion section of the gas turbine combustor, and when a combustion temperature in the at least one combustion section reaches a combustion temperature above the first set temperature, the fuel ratio supplied to the at least one combustion section is regulated so as to be decreased by an amount that is within a range of an increase in the fuel ratio when a combustion air increases in moisture content.

7. The fuel flow control method of a gas turbine combustor provided in a humid air gas turbine, according to claim 6, wherein a second set temperature being higher than the first set temperature is provided for combustion temperature in the at least one combustion section of the gas turbine combustor, and when a combustion temperature in the at least one combustion section reaches the second set temperature, which is higher than the first set temperature, the fuel ratio supplied to the at least one combustion section is regulated so as to become equivalent to the fuel ratio supplied to the remaining combustion sections.

8. The fuel flow control method of a gas turbine combustor provided in a humid air gas turbine, according to claim 1, comprising the fuel flow control method of a gas turbine combustor provided in a humid air gas turbine provided with an intake spraying device for spraying water on an intake air in an intake section of the compressor, and wherein the fuel flow rate supplied to the combustion sections of the gas turbine combustor is controlled by evaluating a moisture content of a combustion air supplied to the gas turbine combustor from the humidifier on the basis of a humidification water quantity in the intake spraying device, a humidification water quantity supplied to a compression air, and an air temperature after humidification with the humidifier, and regulating the fuel ratio of the fuel flow rate supplied to the at least one combustion section formed in the gas turbine combustor and the fuel flow rate supplied to the remaining combustion sections on the basis of the evaluation of moisture content in the combustion air.

* * * * *